US012739446B2

(12) United States Patent
Yang et al.

(10) Patent No.: US 12,739,446 B2
(45) Date of Patent: Sep. 15, 2026

(54) METHOD, APPARATUS, DEVICE, READABLE STORAGE MEDIUM AND PRODUCT FOR MEDIA CONTENT RECOMMENDATION

(71) Applicant: Beijing Zitiao Network Technology Co., Ltd., Beijing (CN)

(72) Inventors: Pei Yang, Beijing (CN); Tianyi Xu, Beijing (CN); Yonglin Luo, Beijing (CN)

(73) Assignee: BEIJING ZITIAO NETWORK TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 18/877,239

(22) PCT Filed: Nov. 15, 2023

(86) PCT No.: PCT/CN2023/131889
§ 371 (c)(1),
(2) Date: Dec. 19, 2024

(87) PCT Pub. No.: WO2024/104402
PCT Pub. Date: May 23, 2024

(65) Prior Publication Data

US 2025/0386060 A1 Dec. 18, 2025

(30) Foreign Application Priority Data

Nov. 16, 2022 (CN) ......................... 202211436864.9

(51) Int. Cl.
*H04N 21/2187* (2011.01)
*H04N 21/466* (2011.01)
*H04N 21/475* (2011.01)

(52) U.S. Cl.
CPC ..... *H04N 21/2187* (2013.01); *H04N 21/4668* (2013.01); *H04N 21/4758* (2013.01)

(58) Field of Classification Search
CPC ........... H04N 21/2187; H04N 21/4668; H04N 21/4758; H04N 21/41407;
(Continued)

(56) References Cited

U.S. PATENT DOCUMENTS

2008/0209325 A1* 8/2008 Suito .................. H04N 21/8405
2008/0271078 A1* 10/2008 Gossweiler ............ H04N 21/47 725/40
(Continued)

FOREIGN PATENT DOCUMENTS

CN 104378664 A 2/2015
CN 108271077 A 7/2018
(Continued)

OTHER PUBLICATIONS

An English translation of CN 111782101 A Oct. 16, 2020 (Year: 2020).*
(Continued)

*Primary Examiner* — Gigi L Dubasky
(74) *Attorney, Agent, or Firm* — Astute IP Law Group

(57) ABSTRACT

Embodiments of the disclosure provide a method, apparatus, device, readable storage medium and product for media content recommendation, and the method includes: displaying, in a media content play interface, a predetermined recommendation control associated with a target topic, wherein the recommendation control comprises at least one piece of live content information and a state control corresponding to a respective piece of live content information, the at least one piece of live content information corresponds to at least one target event associated with the target topic; and determining time information corresponding to the
(Continued)

target topic, determining progress information of the target event corresponding to the live content information based on the time information, and determining a state control matching the progress information.

20 Claims, 12 Drawing Sheets

(58) Field of Classification Search
CPC ......... H04N 21/42224; H04N 21/4312; H04N 21/44222; H04N 21/4756; H04N 21/4622; H04N 21/47214; H04N 21/4722; H04N 21/4826; H04N 21/4882; G06F 9/451; G06F 16/435
See application file for complete search history.

(56) References Cited

U.S. PATENT DOCUMENTS

2014/0229990 A1 8/2014 Lee et al.
2014/0337773 A1 11/2014 Phang et al.
2016/0189042 A1* 6/2016 Gill ..................... G06F 16/9535 706/11
2018/0113579 A1* 4/2018 Johnston ............... G06F 3/0482
2019/0163752 A1 5/2019 Barlaskar et al.
2022/0080261 A1 3/2022 Li
2022/0321935 A1 10/2022 Aher et al.

FOREIGN PATENT DOCUMENTS

CN 111782101 A * 10/2020 ............ A63F 13/86
CN 112333509 A 2/2021
CN 113132787 A 7/2021
CN 113420223 A 9/2021
CN 113468370 A 10/2021
CN 114491260 A 5/2022
CN 114564269 A 5/2022
CN 114707065 A 7/2022
CN 115309976 A 11/2022
CN 115687666 A 2/2023
JP 2015115802 A 6/2015
JP 2020-202468 A 12/2020
WO 2008090799 A1 7/2008
WO 2009107725 A1 9/2009
WO 2022044904 A1 3/2022

OTHER PUBLICATIONS

"Interactive Feed (Bundesliga Interactive live stream), Opens a new window to watch football matches", Available on internet at: https://www.sohu.com/a/516803312_120330264?_trans_=000019_wzwza, 2020, 7 pages.
"The Tiktok FEED streams display AD card components, making it easier to gather leads", woshizmt.cn, Available on internet at: http://www.woshizmt.cn/dsp/jrtt/2564.html, 2022, 5 pages.
International Search Report and Written Opinion for PCT/CN2023/131889, mailed on Jan. 3, 2024, 13 pages.
Office Action for Chinese Patent Application No. 202211436864.9, mailed on Jun. 28, 2025, 19 pages.
Office Action for Japanese Patent Application No. 2024-574788, mailed on Jan. 6, 2026, 14 pages.
Extended European Search Report for European Patent Application No. 23890833.9, mailed on Mar. 23, 2026, 10 pages.

* cited by examiner

METHOD, APPARATUS, DEVICE, READABLE STORAGE MEDIUM AND PRODUCT FOR MEDIA CONTENT RECOMMENDATION

CROSS-REFERENCE TO RELATED APPLICATIONS

This application is a national stage application based on International Patent Application No. PCT/CN2023/131889, filed Nov. 15, 2023, which claims priority to Chinese Patent Application No. CN 202211436864.9, entitled "METHOD, APPARATUS, DEVICE, READABLE STORAGE MEDIUM AND PRODUCT FOR MEDIA CONTENT RECOMMENDATION" filed on Nov. 16, 2022, the contents of which are hereby incorporated by reference in their entireties.

FIELD

Embodiments of the present disclosure relate to the technical field of interface interaction, in particular to a method, apparatus, device, readable storage medium and product for media content recommendation.

BACKGROUND

In order to enable users to view more trending topic information on a video playback interface, the existing video software usually inserts a recommendation card into the media content flow and displays recommended contents of the current trending topics in the recommendation card.

SUMMARY

The embodiments of the present disclosure provide a method, apparatus, device, readable storage medium and product for media content recommendation.

In a first aspect, an embodiment of the present disclosure provides a method of media content recommendation, including: displaying, in a media content play interface, a predetermined recommendation control associated with a target topic, wherein the recommendation control includes at least one piece of live content information and a state control corresponding to a respective piece of live content information, the at least one piece of live content information corresponds to at least one target event associated with the target topic; and determining time information corresponding to the target topic, determining progress information of the target event corresponding to the live content information based on the time information, and determining a state control matching the progress information.

In a second aspect, an embodiment of the present disclosure provides an apparatus for media content recommendation, including: a display module, configured to display, in a media content play interface, a predetermined recommendation control associated with a target topic, wherein the recommendation control includes at least one piece of live content information and a state control corresponding to a respective piece of live content information, the at least one piece of live content information corresponds to at least one target event associated with the target topic; and a determination module, configured to determine time information corresponding to the target topic, determining progress information of the target event corresponding to the live content information based on the time information, and determining a state control matching the progress information.

In a third aspect, an embodiment of the present disclosure provides an electronic device, including a processor and a memory. The memory stores computer executable instructions. The processor executes the computer executable instructions stored in the memory, to enable the processor to perform the method of media content recommendation according to the first aspect and various possible designs of the first aspect.

In a fourth aspect, an embodiment of the present disclosure provides a computer readable storage medium having stored computer executable instructions which, when executed by a processor, implement the method of media content recommendation according to the first aspect and the possible designs of the first aspect.

In a fifth aspect, an embodiment of the present disclosure provides a computer program product, including a computer program. The computer program, when executed by a processor, implements the method of media content recommendation according to the first aspect and various possible designs of the first aspect.

BRIEF DESCRIPTION OF DRAWINGS

In order to more clearly illustrate the embodiments of the present disclosure or the technical solutions in the prior art, the accompanying drawings used in the description of the embodiments or the prior art will be briefly introduced below, and it will be apparent that the drawings in the following description are some embodiments of the present disclosure, and those skilled in the art may also obtain other drawings according to these drawings without creative labor.

DETAILED DESCRIPTION

In order to make the objectives, technical solutions and advantages of the embodiments of the present disclosure clearer, the technical solutions in the embodiments of the present disclosure will be clearly and completely described below with reference to the accompanying drawings in the embodiments of the present disclosure. Apparently, the described embodiments are a part of the embodiments of the present disclosure, not all of them. All other embodiments obtained by those skilled in the art based on the embodiments of the present disclosure without creative efforts shall fall within the scope of the present disclosure.

In order to solve the technical problem of single display content of the existing recommendation card, the present disclosure provides a method, apparatus, device, readable storage medium and product for media content recommendation.

It should be noted that the method, apparatus, device, readable storage medium and product for media content recommendation provided by the present disclosure may be applied to any scenario of content recommendation.

A recommendation card inserted into the existing media content flow is generally displayed with contents such as a temporal context of a trending topic event, a trending topic list of a text type, and the like. However, the display content is relatively single.

In order to enrich the display content in the recommendation card and enable users to obtain more information on the recommendation card, in addition to the existing display content, a live content associated with a target topic may be displayed on the recommendation card. Further, when the live associated with the target topic is large, a state control corresponding to progress information may also be displayed based on the progress of each live. Therefore, in the process of browsing the media content, users may view the associated live of the target topic through the recommendation card inserted in the media content flow. In addition, the state of each associated live may be intuitively determined through the state control.

Figure 1:
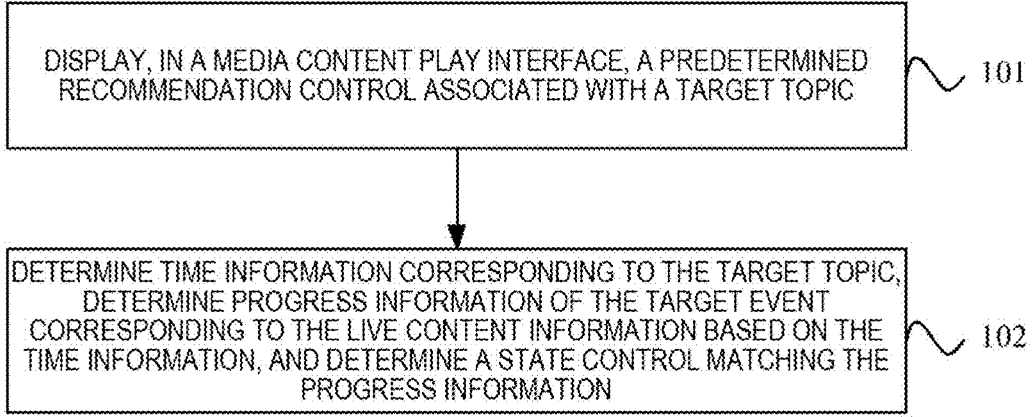
FIG. 1 is a schematic flowchart of a method of media content recommendation provided in an embodiment of the present disclosure.

FIG. 1 is a schematic flowchart of a method of media content recommendation provided in an embodiment of the present disclosure. As shown in FIG. 1, the method includes the following steps.

At Step 101: display, in a media content play interface, a predetermined recommendation control associated with a target topic. The recommendation control includes at least one piece of live content information and a state control corresponding to a respective piece of live content information. The at least one piece of live content information corresponds to at least one target event associated with the target topic.

The execution entity of this embodiment is an apparatus for media content recommendation, and the apparatus for media content recommendation may be coupled to a terminal device, so that the display and interaction of the recommendation control can be implemented on the terminal device. Optionally, the apparatus for media content recommendation may further be coupled to a server, and the server may be communicatively connected to the terminal device. Therefore, the server may control the terminal device to perform the display and interaction of the recommendation control.

In this implementation, the media content play interface may be a play interface for playing the media content flow. For example, the media content in the media content flow may be switched in the media content play interface through up and down swiping. In order to enable the user to browse richer information in the media content play interface, a predetermined recommendation control associated with the target topic may be displayed in the media content play interface. The target topic includes, but is not limited to, a sporting game event, a conference, and the like.

Further, the target topic may be associated with at least one target event. For example, the target event is a live football game, and the predetermined football game event may be associated with at least one game live. Therefore, the recommendation control may include at least one piece of live content information, and the at least one piece of live content information corresponds to at least one target event associated with the target topic. Optionally, since the target event is generally within a specified time range, in order to avoid the user missing the target event of interest, the live content information may include a live preview corresponding to the target event, a live corresponding to the target event, and a live playback corresponding to the target event.

Optionally, in order to further enrich the recommended content in the recommendation control and enable the user to more intuitively determine the progress of each target event in the recommendation control, the recommendation control may further include a state control corresponding to a respective piece of live content information. It can be displayed with different state controls according to different progress information of the target event.

At Step 102: determine time information corresponding to the target topic, determine progress information of the target event corresponding to the live content information based on the time information, and determine a state control matching the progress information.

In this implementation, the target topic generally corresponds to predetermined time information. For example, the target event is a live football game, a football game event is often predetermined with a game schedule, and the game schedule includes the time of each game. Therefore, in order to accurately display the state control, the time information corresponding to the target topic may be determined. The progress information of the target event corresponding to the live content information is determined based on the time information. Further, a state control matching the progress information may be displayed in the recommendation control based on the progress information corresponding to the target event.

Figure 2:
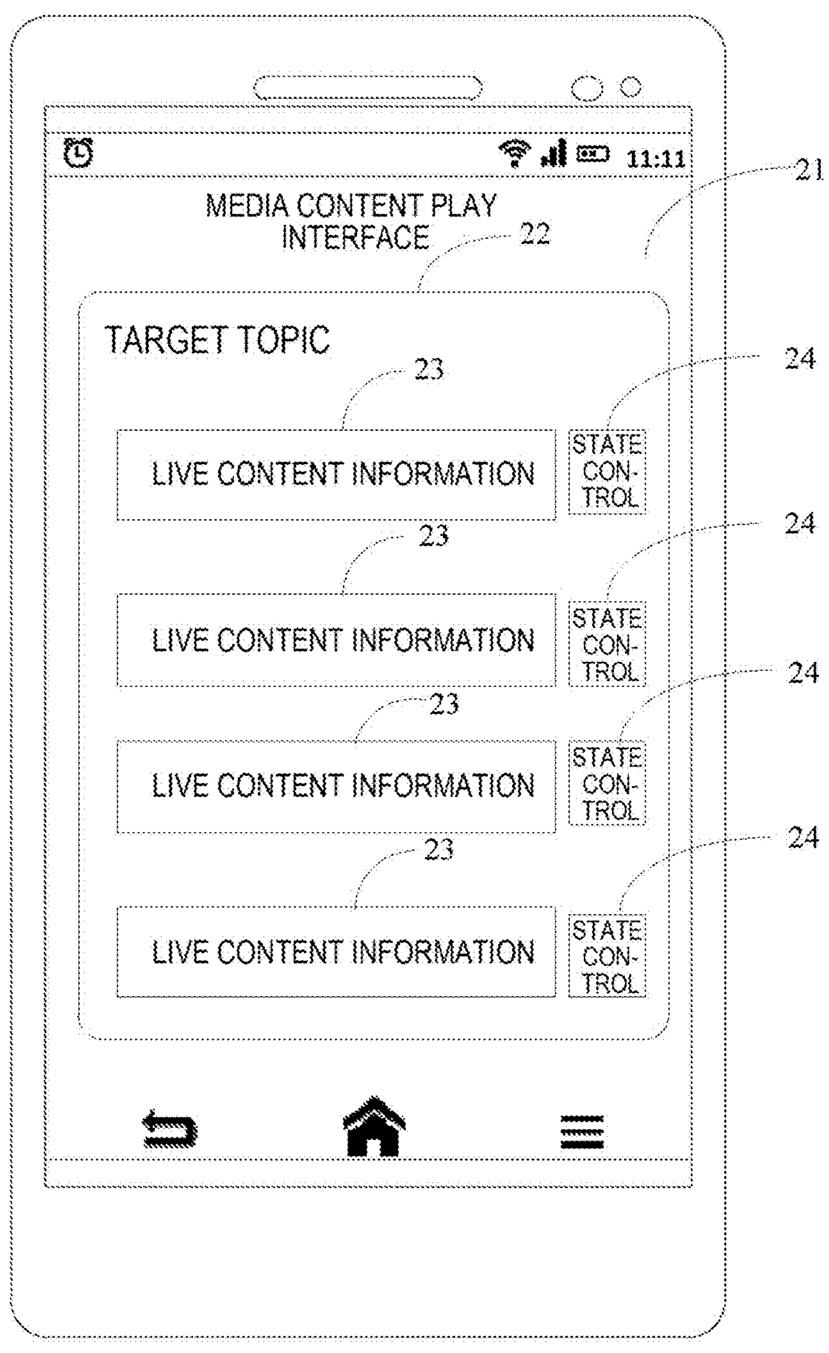
FIG. 2 is a schematic diagram of a display interface provided in an embodiment of the present disclosure.

FIG. 2 is a schematic diagram of a display interface provided in an embodiment of the present disclosure.

As shown in FIG. 2, a recommendation control 22 is displayed in a media content play interface 21. The recommendation control 22 is displayed with at least one piece of live content information 23 and a state control 24 corresponding to a respective piece of live content information.

In the method of media content recommendation provided in this embodiment, a recommendation control associated with a target topic is displayed in a media content play interface, and at least one piece of live content information and a state control corresponding to a respective piece of live content information are displayed in the recommendation control. Therefore, more diversified content can be displayed in the recommendation control. In addition, the user can learn more content related to the target topic through the recommendation control and intuitively know the state corresponding to the respective piece of live content information through the state control in the recommendation interface, so that the display effect and the interaction efficiency are improved on the basis of enriching the display content in the recommendation control.

Further, on the basis of any of the foregoing embodiments, after Step 101, the method further includes in response to a switching triggered by the user in the media content play interface, switching to play a media content in the predetermined media content flow.

In this embodiment, if the user performs the browsing of the media content flow in the media content play interface, the recommendation control may be displayed in the media content play interface by performing the switching on the media content flow.

Correspondingly, if the user is not interested in the currently displayed recommendation control or wants to continue browsing more media content, the switching may be triggered again in the media content play interface. The switching includes, but is not limited to, an up down swiping and the like in the media content play interface. In response to the switching, the media content in the predetermined media content flow may be switched to play.

According to the method of media content recommendation provided by the embodiment, the media content in the media content flow is switched to play in response to the switching, so that the switching between the recommendation control and the media content can be quickly realized, and the user can view more diversified content in the media content play interface.

Further, on the basis of any of the foregoing embodiments, the recommendation control further includes at least one recommended media content associated with the target topic, Step 101 include determining, in a predetermined topic list associated with the target topic, target list content satisfying a predetermined display condition; displaying at least one recommended media content associated with the target list content in the recommendation control; determining at least one piece of live content information associated with the target list content and/or recommended media content; and displaying, in the recommendation control, the at least one piece of live content information and a state control corresponding to the respective piece of live content information.

In this embodiment, the topic list may be predetermined. The topic list includes a plurality of list contents of current trending topics. In order to determine the display content in the recommendation control, a display condition may further be predetermined. The display condition may be displaying a list content with the highest current popularity, displaying a list content ranked in front of the topic list, and the like. At least one target list content may be determined in the topic list associated with the target topic based on the predetermined display condition.

Each target list content may correspond to at least one media content. After determining the target list content, at least one recommended media content associated with the target list content may be displayed in the recommendation control. The at least one piece of live content information is further determined based on the target list content and/or the recommended media content.

For example, the target event is a live football game, and the recommended media content may be the media content titled "football game event team A vs team B". Correspondingly, the live content information associated with the recommended media content may be the subsequent game live information of the winner between the team A and the team B.

Figure 3:
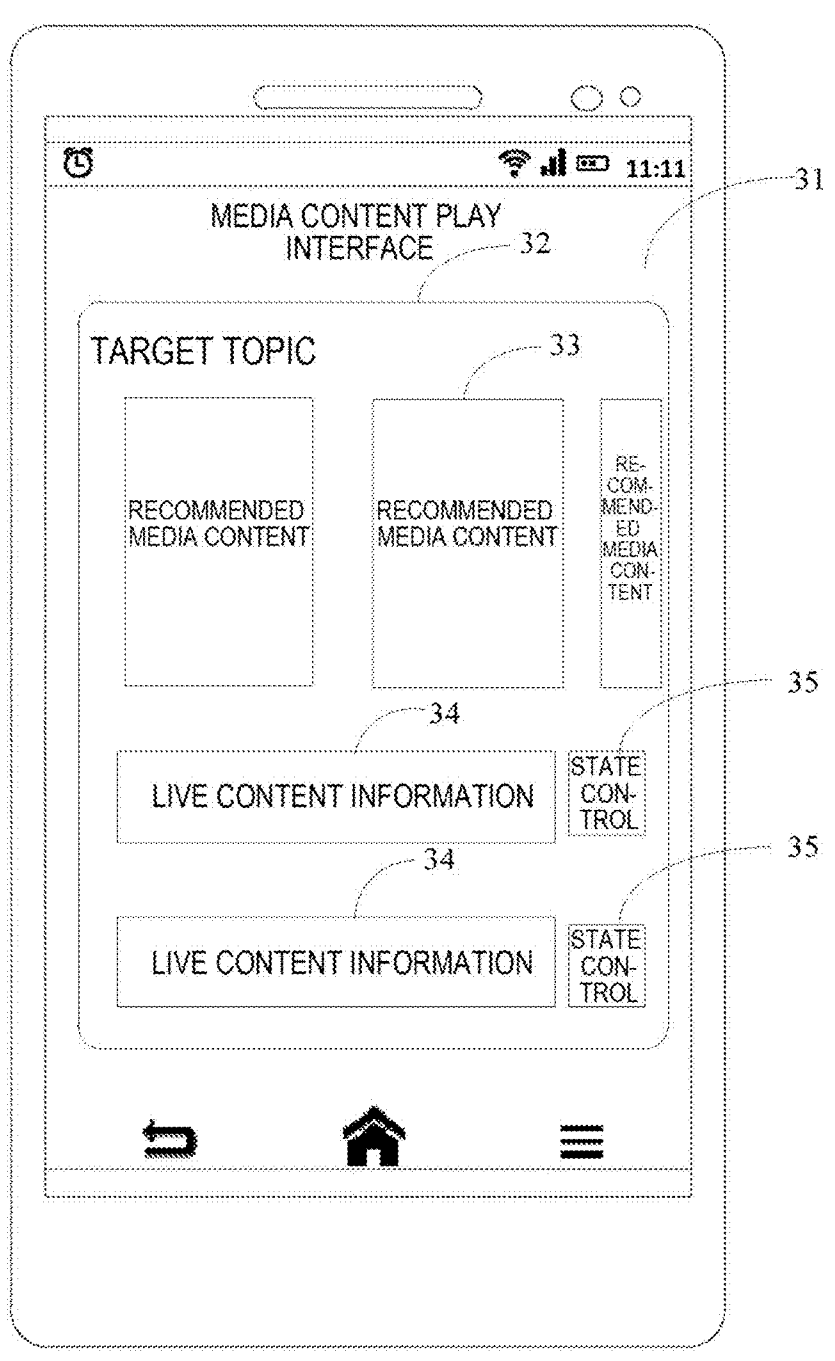
FIG. 3 is a schematic diagram of still another display interface provided in an embodiment of the present disclosure.

FIG. 3 is a schematic diagram of still another display interface provided in an embodiment of the present disclosure. As shown in FIG. 3, a recommendation control 32 is displayed in a media content play interface 31. At least one recommended media content 33 associated with a target list content is displayed in the recommendation control 32, and at least one piece of live content information 34 associated with the target list content and/or the recommended media content 33 and a state control 35 corresponding to a respective piece of live content information 34 are determined and displayed based on the at least one recommended media content 33.

According to the method of media content recommendation provided in the embodiment, the target list content satisfying the predetermined display condition is determined in the topic list associated with the target topic, and at least one recommended media content and at least one piece of live content information associated with the target list content are displayed in the recommendation control, so that the display content in the recommendation control can be further enriched, and the user can view richer content in the media content play interface through the recommendation control.

Further, on the basis of any of the foregoing embodiments, Step 101 includes: playing a predetermined media content flow in the media content play interface; and in response to a switching triggered by the user in the media content play interface, switching to display the recommendation control in the media content play interface.

Alternatively, Step 101 includes: displaying, in the media content play interface, a triggering control associated with the target topic; and in response to a triggering by the user on the triggering control, displaying the recommended control in the media content play interface.

In this embodiment, the predetermined media content flow may be played in the media content play interface. If the user performs the browsing of the media content flow in the media content play interface, the recommendation control may be switched to display in the media content play interface by performing the switching on the media content flow.

Optionally, for each target topic corresponding to the recommendation control, a triggering control associated with the target topic may be displayed in the media content play interface. For example, a triggering control corresponding to the football game event may be displayed on the sidebar of the media content play interface. The recommended control is displayed in the media content play interface in response to a triggering by the user on the triggering control.

According to the method of media content recommendation provided in this embodiment, the recommendation control is displayed based on the switching by the user in the media content flow, or the recommendation control is displayed based on the predetermined triggering of the triggering control, so that the user can implement the viewing of the recommendation control in different manners. The flexibility of display of the recommendation control is improved, and the display effect can be improved.

Figure 4:
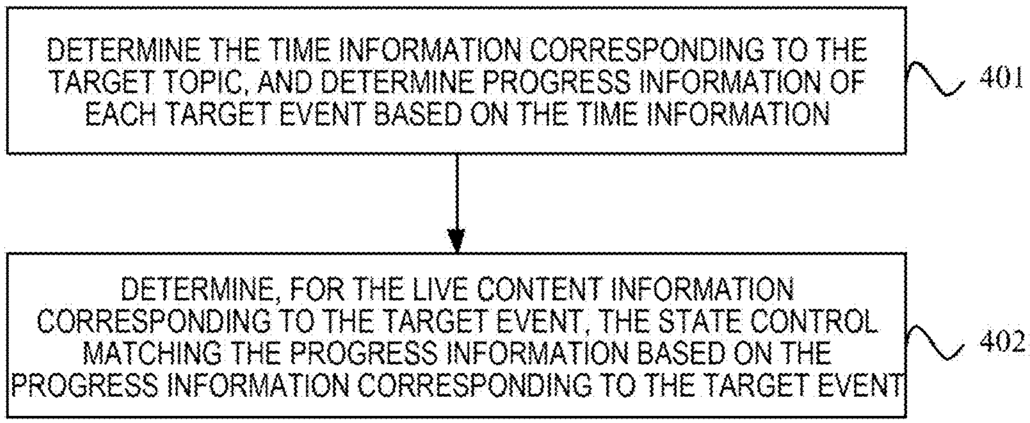
FIG. 4 is a schematic flowchart of a method of media content recommendation provided in still another embodiment of the present disclosure.

FIG. 4 is a schematic flowchart of a method of media content recommendation provided in still another embodiment of the present disclosure. On the basis of any of the foregoing embodiments, as shown in FIG. 4, Step 102 includes the following steps.

At Step 401: determine the time information corresponding to the target topic, and determine progress information of each target event based on the time information.

At Step 402: determine, for the live content information corresponding to the target event, the state control matching the progress information based on the progress information corresponding to the target event.

In this embodiment, in order to achieve accurate display of the state control, the time information corresponding to the target topic may be determined. The time information may include the in-progress time of each target event associated with the target topic. Therefore, the progress information of each target event may be determined based on the time information and the current time.

After determining the progress information of each target event, a state control matching the progress information is determined based on the progress information corresponding to the target event for the live content information corresponding to the target event.

Optionally, the target event is a target live.

According to the method of media content recommendation provided in the embodiment, the progress information of the target event is determined based on the time information corresponding to the target topic, the state control corresponding to a respective piece of live content information in the recommendation control can be accurately switched based on the progress information, the accuracy and real-time performance of the state control display are improved, and the user can view the information of the target topic more accurately in the recommendation control.

Optionally, based on any of the foregoing embodiments, the target topic includes a target game event.

Step 401 includes: determining game schedule information corresponding to the target game event, and determining progress information of a target live corresponding to each game based on the game schedule information, wherein the target game event includes at least one game. Step 402 includes: determining, for the target live corresponding to the game, the state control matching the progress information based on the progress information corresponding to the target live.

In this embodiment, the target topic may specifically be a target game event, and the target game event may include at least one game. Accordingly, the target event may be the live of each game in the target game event. Therefore, the game schedule information corresponding to the target game event may be determined, and the progress information of the target live corresponding to each game is determined based on the game schedule information and the current time information. Further, for the target live corresponding to the game, a state control matching the progress information is determined based on the progress information corresponding to the target live.

For example, if the football game live time of the target event team A vs team C is on Nov. 28, 2022, and the current time is on Nov. 27, 2022, it may be determined that the progress information of the football game live has not started. At this time, a state control corresponding to the progress having not started may be displayed.

According to the method of media content recommendation provided in the embodiment, the game schedule information corresponding to the target event is determined, and the state control of the target live corresponding to each game is determined based on the game schedule information, so that the state control of the target live corresponding to the game can be accurately switched, the user can know the target game event through the recommendation control, avoiding the user from missing the game of interest and improving the display effect.

Optionally, on the basis of any of the foregoing embodiments, the progress information of the target event includes the target event having not started. Step 102 includes, for each target event, in accordance with a determination that the progress information of the target event is that the target event has not started, determining a predetermined reservation control as the state control matching the progress information. After Step 102, the method further includes: displaying, in a display area associated with the live content information, the predetermined reservation control and a start time corresponding to the target event.

In this embodiment, if the progress information of the target event is that the target event has not started, a predetermined reservation control may be determined as a state control matching the progress information.

The predetermined reservation control may be displayed in a display area associated with the live content information. Therefore, the user can implement a reservation on the live content information corresponding to the target event based on the reservation control. In addition, in order to enable the user to browse more associated contents of the target event in the recommendation control, the start time corresponding to the target event may further be displayed in the display area associated with the live content information.

Figure 5:
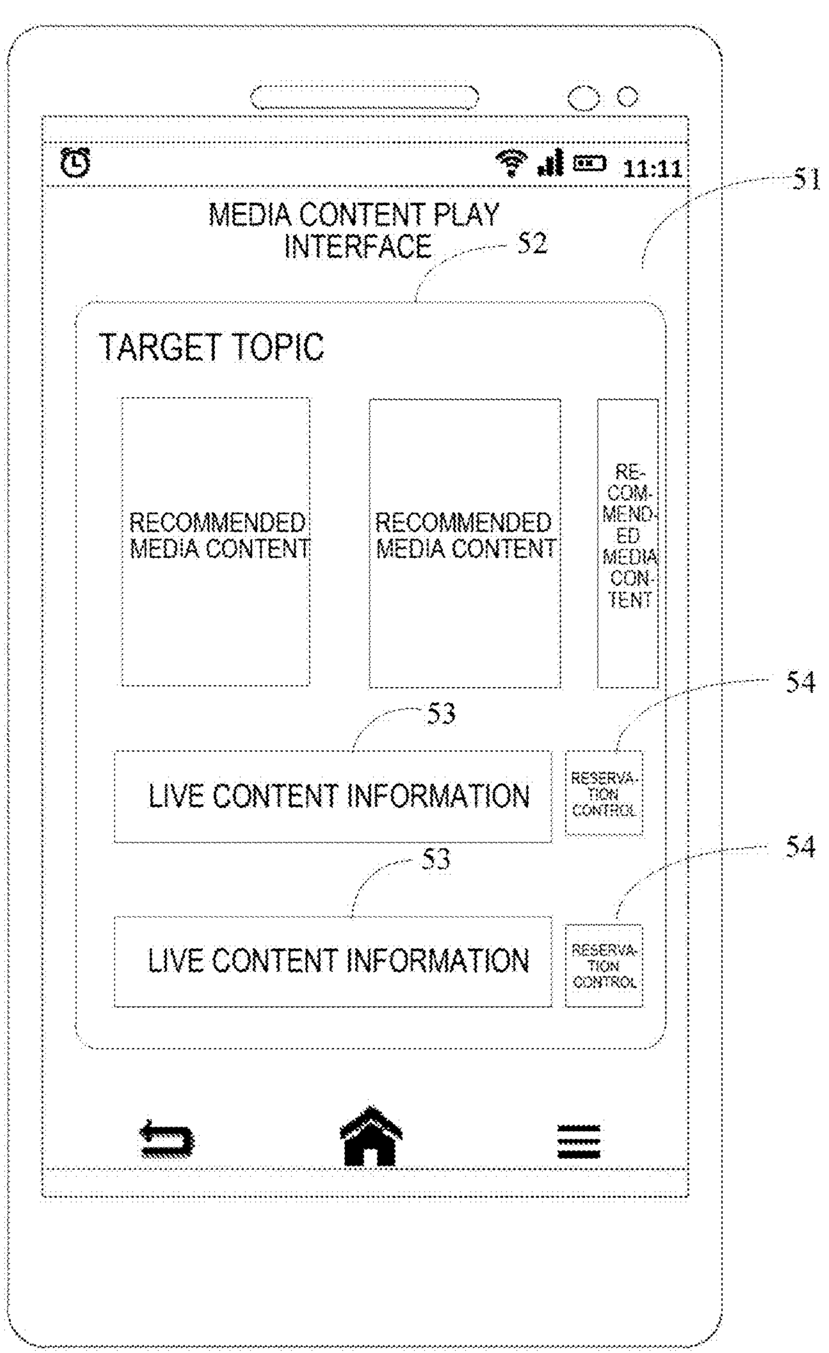
FIG. 5 is a schematic diagram of still another display interface provided in an embodiment of the present disclosure.

FIG. 5 is a schematic diagram of still another display interface provided in an embodiment of the present disclosure. As shown in FIG. 5, a recommendation control 52 is displayed in a media content play interface 51. At least one piece of live content information 53 is displayed in the recommendation control 52. If the progress information of any target event is that the target event has not started, the state control corresponding to the live content information 53 corresponding to the target event is a predetermined reservation control 54. The predetermined reservation control 54 and a start time 55 corresponding to the target event may be displayed in a display area associated with the live content information.

Further, on the basis of any of the foregoing embodiments, after displaying the predetermined reservation control and the start time corresponding to the target event in the display area associated with the live content information, the method further includes: in response to a triggering by the user on the reservation control, displaying text information corresponding to a predetermined reservation on the reservation control, and/or switching the reservation control to a non-triggered state.

In this embodiment, after the reservation control is displayed, the user may perform a triggering on the reservation control according to an actual requirement. In response to the triggering, the text information corresponding to the predetermined reservation may be displayed on the reservation control, and/or the reservation control may be switched to the non-triggered state. The text information corresponding to the reservation may include reserved text information. In the non-triggered state, if the user triggers the reservation control again, the reservation and the interface transformation are not performed again based on the triggering by the user.

According to the method of media content recommendation provided in the embodiment, the reservation control is displayed if the target event has not started, thereby avoiding the user from missing the target event on the basis that the user intuitively knows the progress of the target event.

Further, on the basis of any of the foregoing embodiments, after displaying the predetermined reservation control and the start time corresponding to the target event in the display area associated with the live content information, the method further includes: in response to a triggering by the user on the reservation control, sending, to the user at the start time, a start reminder corresponding to the target event.

In this embodiment, after the user completes the reservation on the live content information corresponding to the target event by triggering the reservation control, if it is detected that the current time matches the start time of the live content information corresponding to the predetermined target event, a start reminder corresponding to the target event may be sent to the user. Optionally, the start reminder corresponding to the target event may be sent to the user in advance, which is not limited in the present disclosure.

According to the method of media content recommendation provided in the embodiment, in response to the triggering by the user on the reservation control, the start reminder is sent to the user when the target event starts, thereby reminding the user to view the target event at the beginning of the target event and avoiding the user from missing the target event of interest.

Optionally, on the basis of any of the foregoing embodiments, the progress information of the target event includes the target event being in progress. Step 102 includes: for each target event, in accordance with a determination that the progress information of the target event is that the target event is in progress, determining a predetermined live control as the state control matching the progress information. After Step 102, the method further includes: displaying the predetermined live control in a display area associated with the live content information, and displaying a display content associated with the target event.

In this embodiment, the progress information of the target event includes the target event being in progress. For example, the target event may be a live football game, and if the football game is in progress, progress information corresponding to the target event is in progress.

If the progress information of the target event is that the target event is in progress, the predetermined live control is determined as a state control matching the progress information. The predetermined live control is displayed in the display area associated with the live content information. Therefore, if the recommendation control is displayed in the media content play interface, the user may determine, based on the state control, that the target event is currently in progress.

Optionally, in order to enable the user to browse more content associated with the target event in the recommendation control, a display content associated with the target event may be displayed in a display area associated with the live content information. For example, the display content associated with the target event may include real-time progress information of the target event.

For example, the target event is a live football game, and the display content may be a current real-time score of the football game.

Figure 6:
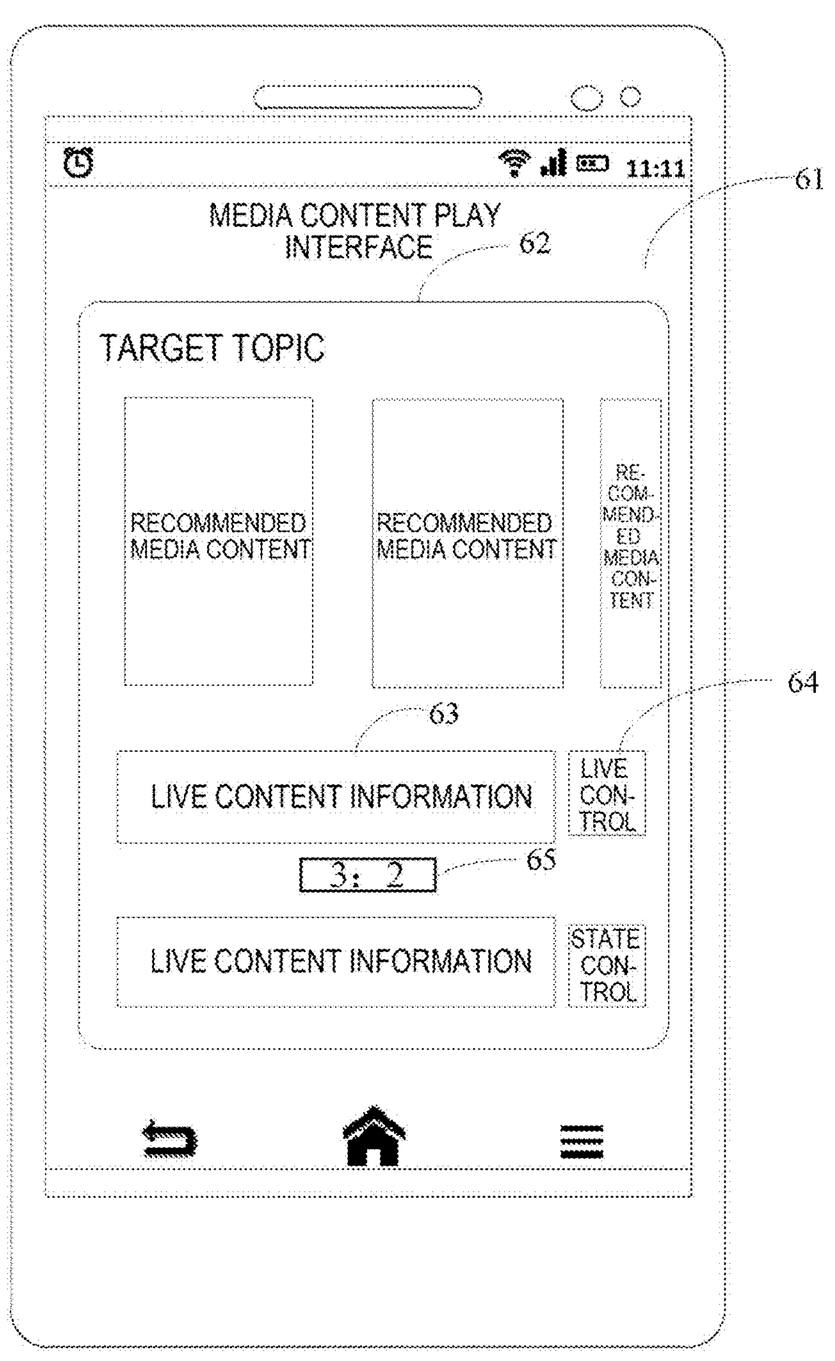
FIG. 6 is a schematic diagram of still another display interface provided in an embodiment of the present disclosure.

FIG. 6 is a schematic diagram of still another display interface provided in an embodiment of the present disclosure. As shown in FIG. 6, a recommendation control 62 is displayed in a media content play interface 61. At least one piece of live content information 63 is displayed in the recommendation control 62. If the progress information of any target event is that the target event is in progress, a state control corresponding to the live content information 63 corresponding to the target event is a predetermined live control 64. The predetermined live control 64 and score information 65 associated with the target event may be displayed in a display area associated with the live content information.

Further, on the basis of any of the foregoing embodiments, after displaying the predetermined live control in the display area associated with the live content information, the method further includes: in response to a triggering by the user on the live control, switching to a live interface corresponding to the target event; and displaying live content corresponding to the target event in the live interface.

In this embodiment, the user may perform a triggering on the live control according to actual requirements. In response to the triggering, the live interface corresponding to the target event may be switched to. The live content corresponding to the target event is displayed in the live interface. Therefore, the live interface can be quickly switched to in the media content play interface, and watching the live content corresponding to the target event is implemented.

Figure 7:
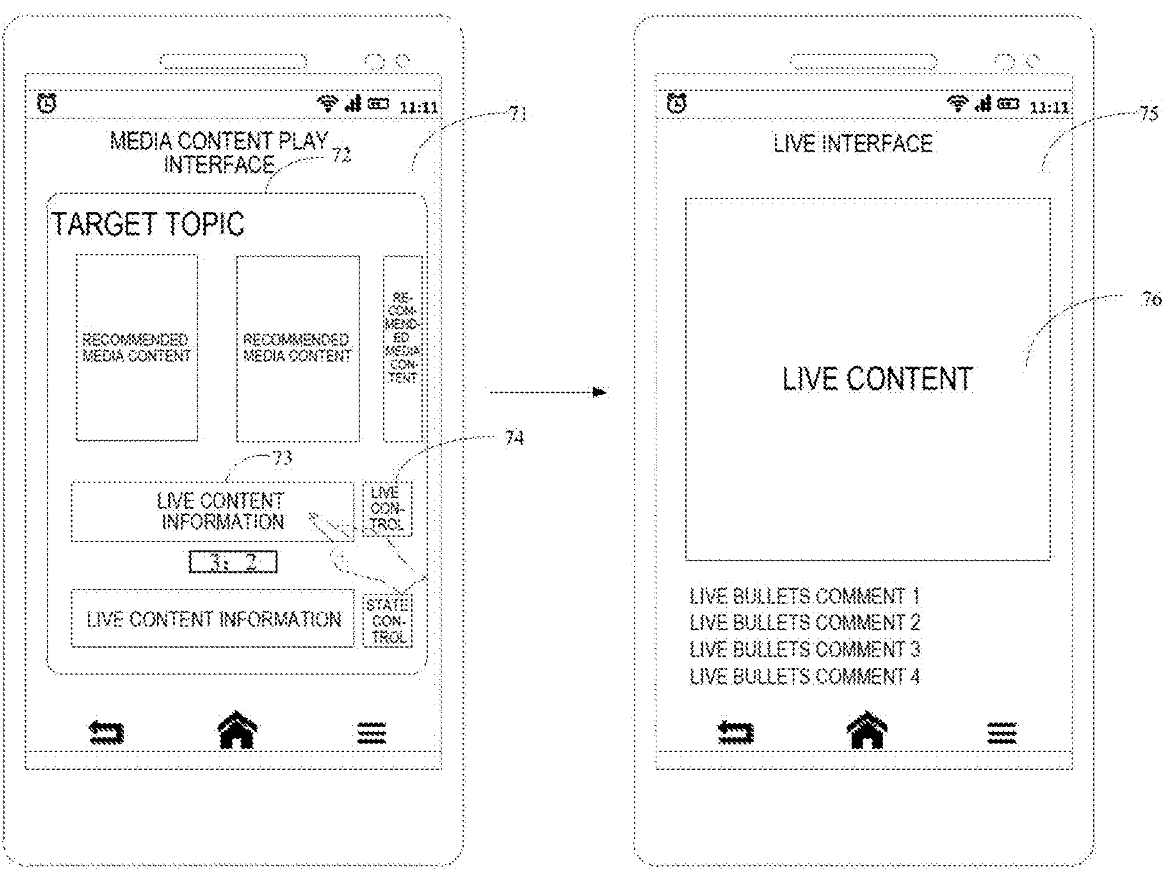
FIG. 7 is a schematic diagram of interface interaction provided in an embodiment of the present disclosure.

FIG. 7 is a schematic diagram of interface interaction provided in an embodiment of the present disclosure. As shown in FIG. 7, a recommendation control 72 is displayed in a media content play interface 71. At least one piece of live content information 73 is displayed in the recommendation control 72. For the target event of which the progress information is in progress, a predetermined live control 74 may be displayed in a display area associated with the live content information 73 corresponding to the target event. In response to a triggering by the user on the live control 74, a live interface 75 corresponding to the target event may be switched to. A live content 76 corresponding to the target event is played in the live interface 75.

According to the method of media content recommendation provided in the embodiment, the live control is displayed if the target event is in progress, so that the target event can be quickly viewed on the basis that the user can know the progress of the target event more intuitively. The procedure of viewing the target event is simplified, and the display effect is improved.

Optionally, on the basis of any of the foregoing embodiments, the progress information of the target event includes the target event being ended. Step 102 includes: for each target event, in accordance with a determination that the progress information of the target event is that the target event is ended, determining a predetermined end control as the state control matching the progress information. After Step 102, the method further includes: displaying the predetermined end control in a display area associated with the live content information and displaying a target event result corresponding to the target event.

In this embodiment, for each target event, if it is detected that the progress information of the target event is that the target event has ended, a predetermined end control may be determined as a state control matching the progress information. The predetermined end control is displayed in a display area associated with the live content information. Therefore, the user can view the live playback of the target event by triggering the end control.

Optionally, the target event result corresponding to the target event may further be displayed in a display area associated with the live content information. Therefore, the user can intuitively view the result of the target event in the recommendation control.

For example, the target event is a live football game, and a result of the game may be displayed in the recommendation control. For example, the result may be that team A vs team C is 3:2.

Figure 8:
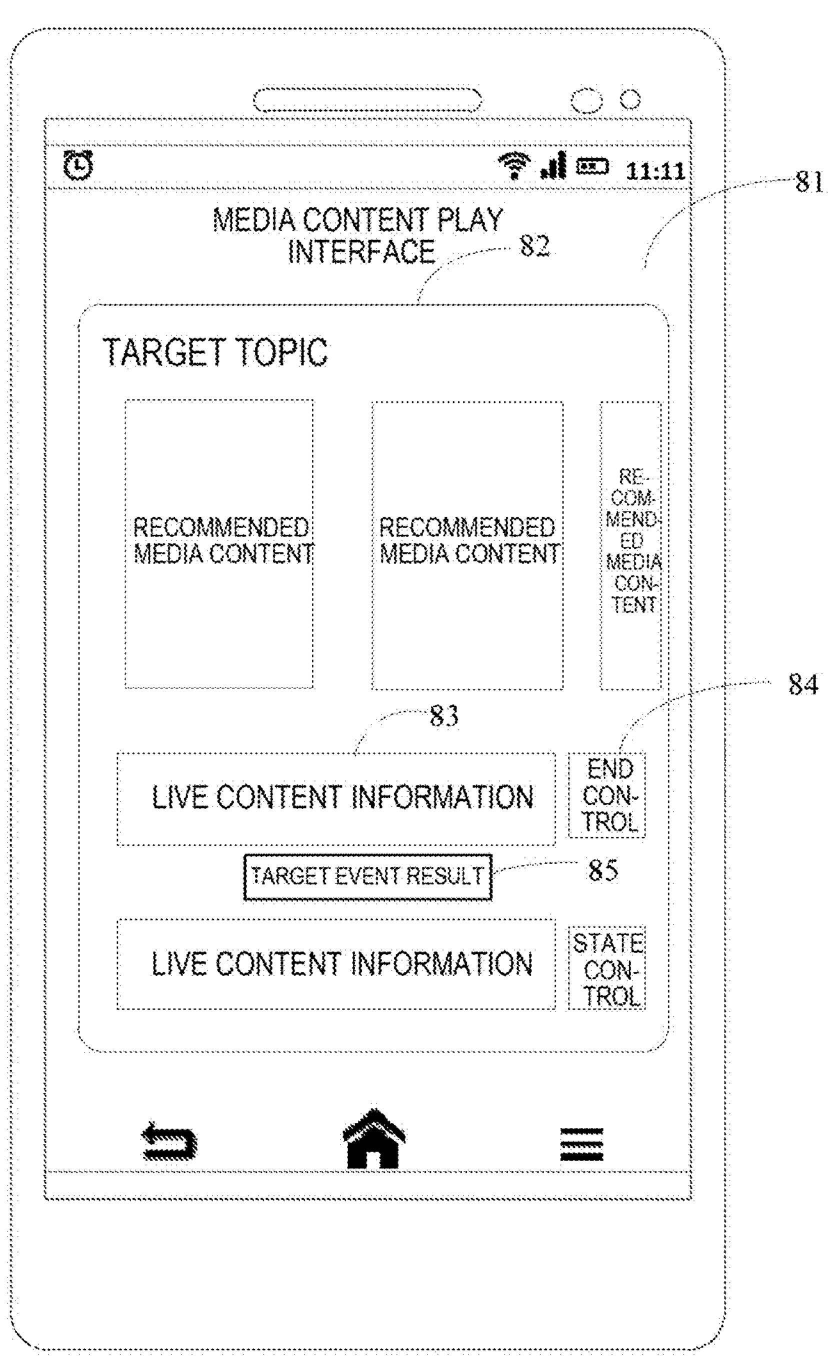
FIG. 8 is a schematic diagram of still another display interface provided in an embodiment of the present disclosure.

FIG. 8 is a schematic diagram of still another display interface provided in an embodiment of the present disclosure. As shown in FIG. 8, a recommendation control 82 is displayed in a media content play interface 81. At least one piece of live content information 83 is displayed in the recommendation control 82. If the progress information of any target event is that the target event has ended, a state control corresponding to the live content information 83 corresponding to the target event is a predetermined end control 84. The predetermined end control 84 and a target event result 85 associated with the target event may be displayed in a display area associated with the live content information.

Further, on the basis of any of the foregoing embodiments, after displaying the predetermined end control in the display area associated with the live content information, the method further includes: in response to a triggering by the user on the end control, switching to a live interface corresponding to the target event; and displaying, in the live interface, live playback content corresponding to the target event. Alternatively, after displaying the predetermined end control in the display area associated with the live content information, the method further includes in response to a triggering by the user on the end control, displaying the time information corresponding to the target topic.

In this embodiment, the user may view the live playback of the target event by triggering the end control. Optionally, the live interface corresponding to the target event is switched to in response to the triggering by the user on the end control. The live playback content corresponding to the target event is displayed in the live interface.

Optionally, the time information corresponding to the target topic may further be displayed in response to a triggering by the user on the end control, so that the user knows the in-process time of more target events associated with the target topic.

According to the method of media content recommendation provided in this embodiment, if the target event has ended, the end control is displayed, so that if the user misses the target event, the viewing of the live playback content of the target event is implemented by triggering the end control.

Optionally, on the basis of any of the foregoing embodiments, the recommendation control further includes a predetermined interaction control, and the interaction control is configured to perform an interaction with a target object associated with the target event in response to a triggering by the user.

Further, the recommendation control may further include a predetermined interaction control, and the predetermined interaction control is configured to implement interaction between the current user and the target object associated with the target event. The target object associated with the target event may be a participant corresponding to the target event. For example, if the target topic is a predetermined football game event, the target event may be a game live of a certain football game in a football game event, and the associated target object may be two teams participating in the football game. A vote control may be displayed in the recommendation control for the current user to select a support team for the game.

Figure 9:
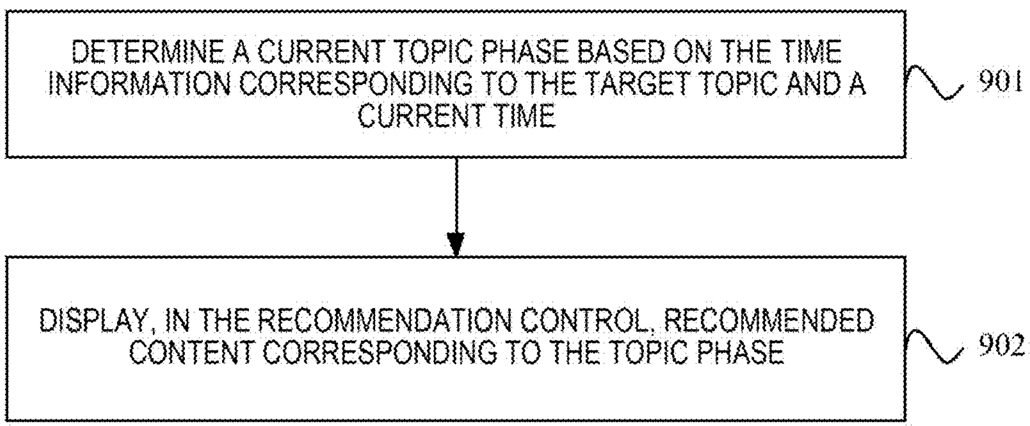
FIG. 9 is a schematic flowchart of a method of media content recommendation provided in still another embodiment of the present disclosure.

FIG. 9 is a schematic flowchart of a method of media content recommendation provided in still another embodiment of the present disclosure. On the basis of any of the foregoing embodiments, before Step 101, the method further includes the following steps.

At Step 901: determine a current topic phase based on the time information corresponding to the target topic and a current time.

At Step 902: display, in the recommendation control, recommended content corresponding to the topic phase.

In this embodiment, since the target topic usually corresponds to a plurality of different phases, in order to enrich the display content in the recommendation control, different recommended contents may be displayed respectively for different phases.

Optionally, the current topic phase may be determined based on the time information corresponding to the target topic and the current time. The recommended content corresponding to the topic phase is displayed in the recommendation control.

For example, the target event is a live football game, and the game event phase may include an opening ceremony phase, closing ceremony phase, round of 16 phase, quarterfinals phase, semifinals phase, finals phase, and the like. Different recommended contents may be set for different event phases, so that the user can browse more recommended contents associated with the game event process based on the recommendation control.

Further, on the basis of any of the foregoing embodiments, Step 902 includes: if the current topic phase is a predetermined first phase, displaying, in the recommendation control, first recommendation information associated with the target topic, wherein the first recommendation information includes one or more of: time information, prediction information for target event result, target list content, or target event recommendation information; if the current topic phase is a predetermined second phase, displaying, in the recommendation control, the at least one piece of live content information and the state control corresponding to the respective live content information, wherein the at least one piece of live content information corresponds one-to-one with at least one target event in the target topic; and if the current topic phase is a predetermined third phase, displaying, in the recommendation control, the live content information corresponding to the target event satisfying the predetermined recommendation condition, the state control corresponding to the live content information, and the predetermined vote control.

In this embodiment, the topic phase may include a first phase, a second phase, and a third phase.

If it is detected that the current topic phase is a predetermined first stage, first recommendation information associated with the target topic is displayed in the recommendation control. The first recommendation information includes one or more of time information, target game event result prediction information, target list content, and target event recommendation information.

For example, the target event is a live football game, the first phase may be an opening ceremony phase, and game schedule information, champion prediction information, list information associated with the football game event, a trending topic event guide, and the like may be displayed in the recommendation control in the opening ceremony phase.

Figure 10:
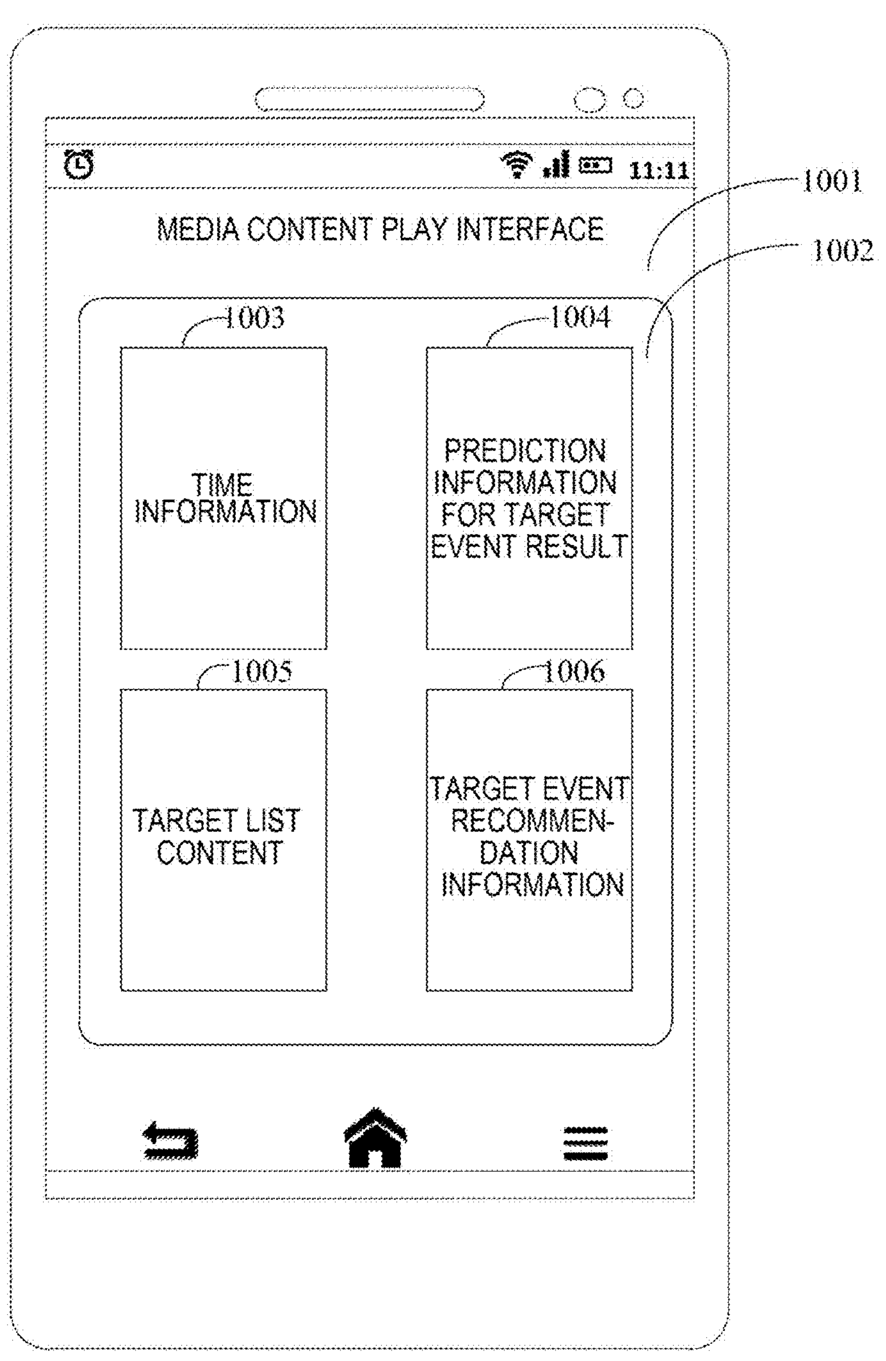
FIG. 10 is a schematic diagram of still another display interface provided in an embodiment of the present disclosure.

FIG. 10 is a schematic diagram of still another display interface provided in an embodiment of the present disclosure. As shown in FIG. 10, a recommendation control 1002 is displayed in a media content play interface 1001. The recommendation control 1002 is displayed with time information 1003, prediction information for target event result 1004, target list content 1005, and target event recommendation information 1106.

If the current topic phase is a predetermined second phase, at least one piece of live content information and a state control corresponding to a respective piece of live content information are displayed in the recommendation control, and the at least one piece of live content information is in a one-to-one correspondence with at least one target event in the target topic.

For example, the target event is a live football game, and the second phase may be a game phase of a round of 16. The recommended media content of the trending topic, the game event live content associated with the recommended media content, and the state control corresponding to the live content of each game event may be displayed in the recommendation control at this phase.

If the current topic phase is a predetermined third phase, live content information corresponding to a target event satisfying a predetermined recommendation condition, a state control corresponding to the live content information, and a predetermined vote control may be displayed in the recommendation control.

For example, the target topic is a football game, and the third phase may be a focus game phase, finals phase, semifinals phase, or the like. At this time, the live content information corresponding to the focus game event, the state control corresponding to the live content information and the vote control corresponding to both parties of the focus game event may be displayed in the recommendation control.

Figure 11:
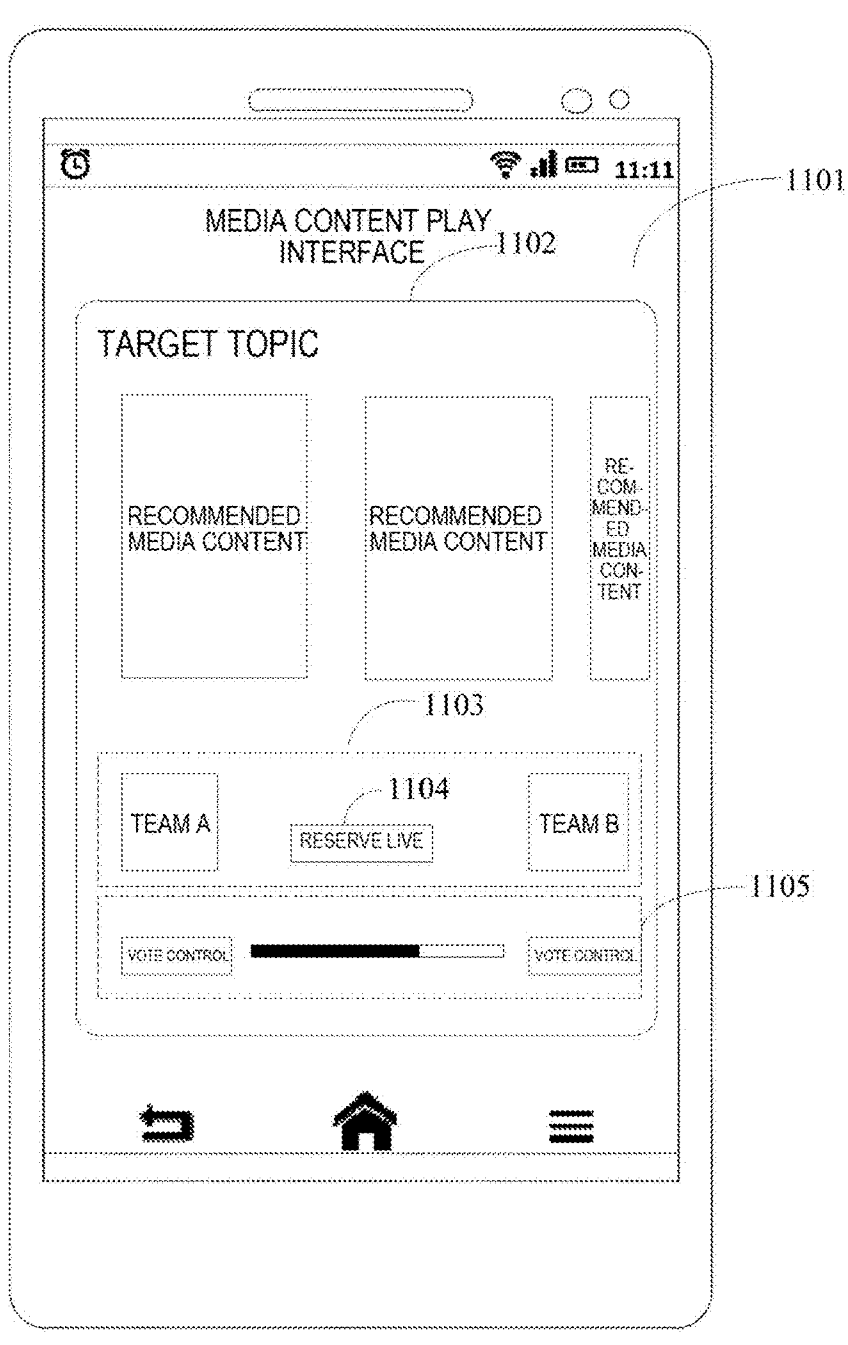
FIG. 11 is a schematic diagram of still another display interface provided in an embodiment of the present disclosure.

FIG. 11 is a schematic diagram of still another display interface provided in an embodiment of the present disclosure. As shown in FIG. 11, a recommendation control 1102 is displayed in a media content play interface 1101. The recommendation control 1102 is displayed with live content information 1103 corresponding to a target event satisfying a predetermined recommendation condition, a state control 1104 corresponding to the live content information 1103, and a predetermined vote control 1105.

According to the method of media content recommendation provided by the embodiment, different recommended contents are displayed in the recommendation control in different topic phases, so that the display content in the recommendation control can be further enriched, and the user can view more recommended content in the recommendation control.

Further, on the basis of any of the foregoing embodiments, the vote control includes a vote sub-control corresponding to respective participants in the target event satisfying the predetermined recommendation condition, after displaying the live content information corresponding to the target event satisfying the predetermined recommendation condition, the state control corresponding to the live content information, and the predetermined vote control in the recommendation control, the method further includes: in response to a triggering by the user on a vote sub-control corresponding to any participant, updating a number of votes corresponding to the participant based on the triggering.

In this embodiment, the target event may correspond to at least two participants. For example, the target event is a live football game, and there may be two participants of the football game in the target event.

In order to improve the engagement degree of the user on the target event and improve the display effect, for each participant, a vote sub-control corresponding to the participant may be displayed in the vote control, respectively.

Therefore, the user may implement vote support for the participant by triggering the vote sub-control corresponding to the participant supported by the user. Correspondingly, in response to the triggering by the user on the vote sub-control corresponding to any participant, the number of votes corresponding to the participant is updated based on the triggering. Therefore, the user can view the vote information corresponding to the target event in the recommendation control.

For example, the target event is a live football game of team A vs team C. The vote control includes respective vote buttons of the team A and the team C. The user may implement vote support for the favorite team by triggering the vote button of the team A or the vote button of the team C.

According to the method of media content recommendation provided in the embodiment, the live content information corresponding to the target event satisfying the predetermined recommendation condition, the state control corresponding to the live content information and the predetermined vote control are displayed in the recommendation control, so that the user can vote the participants of interest in the target event through the triggering on the vote control, the interaction of the recommendation control is enriched, and the display effect can be improved.

Further, on the basis of any of the foregoing embodiments, updating the number of votes corresponding to the participant based on the triggering in response to the triggering by the user on the vote sub-control corresponding to any participant includes: in response to the triggering by the user on the vote sub-control corresponding to any participant, determining a number of times of the triggering, and updating the number of votes corresponding to the participant based on the number of times of the triggering. Alternatively, updating the number of votes corresponding to the participant based on the triggering in response to the triggering by the user on the vote sub-control corresponding to the participant includes: in response to the triggering by the user on the vote sub-control corresponding to any participant, determining a triggering duration corresponding to the triggering; determining a number of times of voting corresponding to the triggering based on the triggering duration and a predetermined mapping relationship between the triggering duration and the number of times of voting; and updating the number of votes corresponding to the participant based on the number of times of voting.

In this embodiment, the user may implement the vote by continuously clicking the vote sub-control. Correspondingly, if the number of votes is updated, in response to the triggering by the user on the vote sub-control corresponding to any participant, the number of times of triggering is determined, and the number of votes corresponding to the participant is updated based on the number of times of triggering. For example, if the user clicks a vote sub-control corresponding to the first participant for ten times, ten votes may be added to the number of votes of the first participant.

Optionally, the user may also implement the vote by continuously clicking the vote sub-control. Correspondingly, if the number of votes is updated, a triggering duration corresponding to the triggering is determined in response to the triggering by the user on the vote sub-control corresponding to any participant.

The number of votes corresponding to the triggering is determined based on the triggering duration and a predetermined mapping relationship between the triggering duration and the number of votes. The number of votes corresponding to the participant is updated based on the number of votes.

For example, the number of votes corresponding to each second is three times. If it is detected that the triggering duration of the vote sub-control corresponding to the first participant triggered by the user is ten seconds, thirty votes may be added to the number of votes for the first participant.

According to the method of media content recommendation provided in the embodiment, the number of votes of the participant is updated based on the number of times of triggering or the triggering duration by the user on the vote sub-control, so that more real-time and more accurate content can be displayed on the recommendation control.

Further, on the basis of any of the foregoing embodiments, after in response to the triggering by the user on the vote sub-control corresponding to any participant, updating the number of votes corresponding to the participant based on the triggering, the method further includes: if the progress information of the target event satisfying the predetermined recommendation condition is in progress, switching to a live interface in response to a triggering by the user on a live control associated with the live content information; and displaying, in the live interface, target live content corresponding to the target event, the vote control, and the updated number of votes.

In this embodiment, if the progress information of the target event satisfying the predetermined recommendation condition is in progress, in response to the triggering by the user on the state control associated with the live content information corresponding to the target event, the live interface is switched to, and the target live content corresponding to the target event is displayed in the live interface.

In order to enable the user to know the support situation for the participant in the target event in time, the target live content corresponding to the target event, the vote control, and the updated number of votes may be displayed in the live interface.

Optionally, the user may also implement the vote and the updating of the number of votes based on the vote control in the live interface.

According to the method of media content recommendation provided in the embodiment, after proceeding to the live interface, the target live content corresponding to the target event, the vote control and the updated number of votes are displayed in the live interface, so that the user can view the number of votes in the live interface, the operation mode of vote data viewing is simplified, and the display effect is further optimized.

Further, on the basis of any of the foregoing embodiments, after Step 101, the method further includes: in response to a triggering by the user on a predetermined display area or a predetermined viewing control in the recommendation control, displaying topic detail information corresponding to the target topic. The topic detail information includes one or more of: time information, promotion chart information, list information.

In this embodiment, if the user wants to know more content corresponding to the target topic, the user may also view topic detail information of the target topic through the recommendation control.

Optionally, the recommendation control may be provided with a viewing control. The topic detail information corresponding to the target topic may be displayed in response to a triggering by the user on the viewing control.

Optionally, a triggerable predetermined display area may also be predetermined in the recommendation control. In response to a triggering by the user on the predetermined display area, the topic detail information corresponding to the target topic may be displayed.

The topic detail information includes one or more of time information, promotion chart information, or list information.

According to the method of media content recommendation provided in the embodiment, the topic detail information corresponding to the target topic is displayed in response to the triggering by the user on the predetermined display area or the predetermined viewing control in the recommendation control, so that the user can further know the target topic and view the recommended content of interest through the recommendation control.

Figure 12:
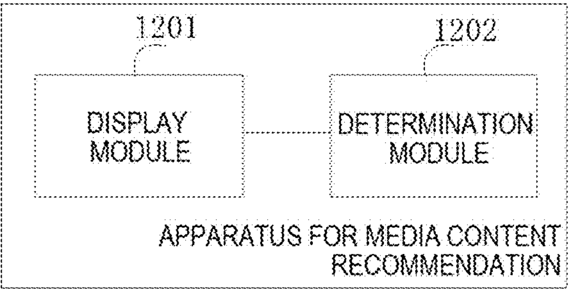
FIG. 12 is a schematic structural diagram of an apparatus for media content recommendation provided in an embodiment of the present disclosure.

FIG. 12 is a schematic structural diagram of an apparatus for media content recommendation provided in an embodiment of the present disclosure. As shown in FIG. 12, the apparatus includes a display module 1201 and a determination module 1202. The display module 1201 is configured to display, in a media content play interface, a predetermined recommendation control associated with a target topic, wherein the recommendation control includes at least one piece of live content information and a state control corresponding to a respective piece of live content information, the at least one piece of live content information corresponds to at least one target event associated with the target topic. The determination module 1202 is configured to determine time information corresponding to the target topic, determine progress information of the target event corresponding to the live content information based on the time information, and determine a state control matching the progress information.

Further, on the basis of any of the foregoing embodiments, the recommendation control further includes at least one recommended media content associated with the target topic. The display module is configured to determine, in a predetermined topic list associated with the target topic, target list content satisfying a predetermined display condition; display at least one recommended media content associated with the target list content in the recommendation control; determine at least one piece of live content information associated with the target list content and/or recommended media content; and display, in the recommendation control, the at least one piece of live content information and a state control corresponding to the respective piece of live content information.

Further, on the basis of any of the above embodiments, the display module is configured to play a predetermined media content flow in the media content play interface; and in response to a switching triggered by the user in the media content play interface, switch to display the recommendation control in the media content play interface. Alternatively, the display module is configured to display, in the media content play interface, a triggering control associated with the target topic; and in response to a triggering by the user on the triggering control, display the recommended control in the media content play interface.

Further, on the basis of any of the above embodiments, the determination module is configured to determine the time information corresponding to the target topic, and determine progress information of each target event based on the time information; and determine, for the live content information corresponding to the target event, the state control matching the progress information based on the progress information corresponding to the target event.

Further, on the basis of any of the foregoing embodiments, the target event is a target live.

Further, on the basis of any one of the foregoing embodiments, the target topic includes a target game event. The determination module is configured to determine game schedule information corresponding to the target game event, determine progress information of a target live corresponding to each game based on the game schedule information, wherein the target game event includes at least one game; and determine, for the target live corresponding to the game, the state control matching the progress information based on the progress information corresponding to the target live.

Further, on the basis of any of the foregoing embodiments, the progress information of the target event includes the target event having not started. The determination module is configured to for each target event, in accordance with a determination that the progress information of the target event is that the target event has not started, determine a predetermined reservation control as the state control matching the progress information. The apparatus further includes: a display module, configured to display, in a display area associated with the live content information, the predetermined reservation control and a start time corresponding to the target event.

Further, on the basis of any of the above embodiments, the apparatus further includes: a processing module, configured to, in response to a triggering by the user on the reservation control, display text information corresponding to a predetermined reservation on the reservation control, and/or switch the reservation control to a non-triggered state.

Further, on the basis of any of the foregoing embodiments, the apparatus further includes: a processing module, configured to, in response to a triggering by the user on the reservation control, send, to the user at the start time, a start reminder corresponding to the target event.

Further, on the basis of any of the foregoing embodiments, the progress information of the target event includes the target event being in progress. The determination module is configured to: for each target event, in accordance with a determination that the progress information of the target event is that the target event is in progress, determine a predetermined live control as the state control matching the progress information. The apparatus further includes: a display module, configured to display the predetermined live control in a display area associated with the live content information, and display a display content associated with the target event.

Further, on the basis of any of the foregoing embodiments, the apparatus further includes: a processing module, configured to, in response to a triggering by the user on the live control, switch to a live interface corresponding to the target event; and a displaying module, configured to display live content corresponding to the target event in the live interface.

Further, on the basis of any of the foregoing embodiments, the progress information of the target event includes the target event being ended. The determination module is configured to: for each target event, in accordance with a determination that the progress information of the target event is that the target event is ended, determine a predetermined end control as the state control matching the progress information. The apparatus further includes: a display module, configured to display the predetermined end control in a display area associated with the live content information, and display a target event result corresponding to the target event.

Further, on the basis of any of the foregoing embodiments, the apparatus further includes: a processing module, configured to, in response to a triggering by the user on the end control, switch to a live interface corresponding to the target event; and a display module, configured to display, in the live interface, live playback content corresponding to the target event. Alternatively, the apparatus further includes: a display module, configured to display, in response to a triggering by the user on the end control, display the time information corresponding to the target topic.

Further, on the basis of any of the foregoing embodiments, the recommendation control further includes a predetermined interaction control, and the interaction control is configured to perform an interaction with a target object associated with the target event in response to a triggering by the user.

Further, on the basis of any of the above embodiments, the apparatus further includes: a determination module, configured to determine a current topic phase based on the time information corresponding to the target topic and a current time; and a display module, configured to display, in the recommendation control, recommended content corresponding to the topic phase.

Further, on the basis of any of the above embodiments, the display module is configured to: in accordance with a determination that the current topic phase is a predetermined first phase, display, in the recommendation control, first recommendation information associated with the target topic, wherein the first recommendation information includes one or more of: time information, prediction information for target event result, target list content, or target event recommendation information; in accordance with a determination that the current topic phase is a predetermined second phase, display, in the recommendation control, the at least one piece of live content information and the state control corresponding to the respective live content information, wherein the at least one piece of live content information corresponds one-to-one with at least one target event in the target topic; and in accordance with a determination that the current topic phase is a predetermined third phase, display, in the recommendation control, the live content information corresponding to the target event satisfying the predetermined recommendation condition, the state control corresponding to the live content information, and the predetermined vote control.

Further, on the basis of any of the foregoing embodiments, the vote control includes a vote sub-control corresponding to respective participants in the target event satisfying the predetermined recommendation condition. The apparatus further includes: a processing module, configured to, in response to a triggering by the user on a vote sub-control corresponding to any participant, update a number of votes corresponding to the participant based on the triggering.

Further, on the basis of any of the above embodiments, the processing module is configured to: in response to the triggering by the user on the vote sub-control corresponding to any participant, determine a number of times of the triggering, and update the number of votes corresponding to the participant based on the number of times of the triggering. Alternatively, the processing module is configured to: in response to the triggering by the user on the vote sub-control corresponding to any participant, determine a triggering duration corresponding to the triggering; determine a number of times of voting corresponding to the triggering based on the triggering duration and a predetermined mapping relationship between the triggering duration and the number of times of voting; and update the number of votes corresponding to the participant based on the number of times of voting.

Further, on the basis of any of the above embodiments, the apparatus further includes: a processing module, configured to, in accordance with a determination that the progress information of the target event satisfying the predetermined recommendation condition is in progress, switch to a live interface in response to a triggering by the user on a live control associated with the live content information; and a display module, configured to display, in the live interface, target live content corresponding to the target event, the vote control, and the updated number of votes.

Further, on the basis of any of the above embodiments, the apparatus further includes: a display module, configured to in response to a triggering by the user on a predetermined display area or a predetermined viewing control in the recommendation control, display topic detail information corresponding to the target topic. The topic detail information includes one or more of: time information, promotion chart information, list information.

Further, on the basis of any of the above embodiments, the media content play interface is configured to play a media content flow.

Further, on the basis of any of the above embodiments, the apparatus further includes: a processing module, configured to, in response to a switching triggered by the user in the media content play interface, switch to play a media content in the predetermined media content flow.

The apparatus provided in this embodiment may be configured to perform the technical solutions in the foregoing method embodiments, and implementation principles and technical effects thereof are similar, and details are not described herein again in this embodiment.

In order to implement the foregoing embodiments, an embodiment of the present disclosure further provides an electronic device, including: a processor and a memory. The memory stores computer executable instructions. The processor executes the computer executable instructions stored in the memory, to cause the processor to perform the method of media content recommendation according to any of the foregoing embodiments.

Figure 13:
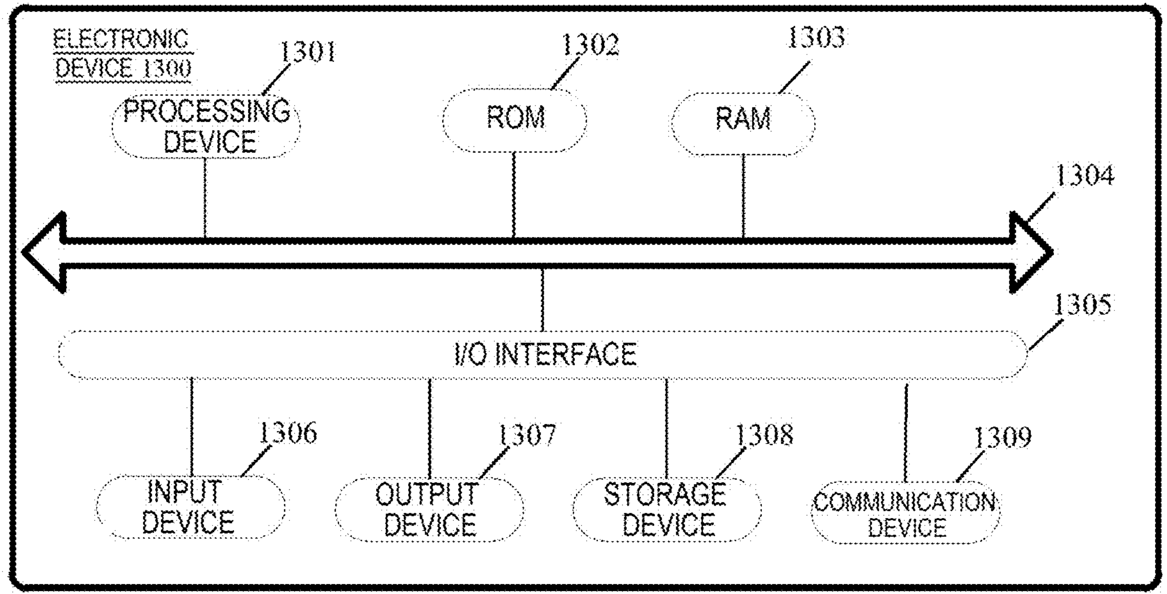
FIG. 13 is a schematic structural diagram of an electronic device provided in an embodiment of the present disclosure.

FIG. 13 is a schematic structural diagram of an electronic device provided in the embodiments of the present disclosure. As shown in FIG. 13, the electronic device 1300 may be a terminal device or a server. The electronic device may include, but is not limited to, a mobile terminal such as a mobile phone, a laptop, a digital broadcast receiver, a personal digital assistant (PDA), a tablet (PAD), a portable multimedia player (PMP), an in-vehicle terminal (for example, a car navigation terminal), and a fixed terminal such as a digital TV, a desktop computer, or the like. The electronic device shown in FIG. 13 is merely an example and should not impose any limitation on the functionality and use ranges of the embodiments of the present disclosure.

As shown in FIG. 13, the electronic device 1300 may include a processing device (for example, a central processing unit or a graphics processor) 1301, and may perform various appropriate actions and processing according to a program stored in a read-only memory (ROM) 1302 or a program loaded into a random access memory (RAM) 1303 from a storage device 1308. In the RAM 1303, various programs and data required by the operation of the electronic device 1300 are also stored. The processing device 1301, the ROM 1302, and the RAM 1303 are connected to each other through a bus 1304. An input/output (I/O) interface 1305 is also connected to the bus 1304.

Generally, the following devices may be connected to the I/O interface 1305: an input device 1306 including, for example, a touch screen, a touch pad, a keyboard, a mouse, a camera, a microphone, an accelerometer, a gyroscope, etc.; an output device 1307 including, for example, a liquid crystal display (LCD), a speaker, a vibrator, etc.; a storage device 1308 including, for example, a magnetic tape, a hard disk, etc.; and a communication device 1309. The communication device 1309 may allow the electronic device 1300 to communicate wirelessly or wired with other devices to exchange data. Although FIG. 13 illustrates an electronic device 1300 having various devices, it should be understood that all illustrated devices are not required to be implemented or provided. More or fewer devices may alternatively be implemented or provided.

In particular, according to the embodiments of the present disclosure, the process described above with reference to the flowchart may be implemented as a computer software program. For example, embodiments of the present disclosure include a computer program product including a computer program embodied on a computer readable medium, the computer program including program code for performing the method shown in the flowchart. In such embodiments, the computer program may be downloaded and installed from the network through the communication device 1309, or installed from the storage device 1308, or from the ROM 1302.

When the computer program is executed by the processing device 1301, the foregoing functions defined in the method of the embodiments of the present disclosure are performed.

It should be noted that the computer readable medium described above may be a computer readable signal medium, a computer readable storage medium, or any combination of the foregoing two. The computer-readable storage medium may be, for example, but not limited to, an electrical, magnetic, optical, electromagnetic, infrared, or semiconductor system, device, or device, or any combination thereof. More specific examples of the computer-readable storage medium may include, but are not limited to, an electrical connection having one or more wires, a portable computer diskette, a hard disk, a random access memory (RAM), a read-only memory (ROM), an erasable programmable read-only memory (EPROM or Flash memory), an optical fiber, a portable compact disk read-only memory (CD-ROM), an optical storage device, a magnetic storage device, or any suitable combination thereof. In the present disclosure, a computer-readable storage medium may be any tangible medium containing or storing a program that may be used by or in connection with an instruction execution system, apparatus, or device. In the present disclosure, a computer readable signal medium may include a data signal propagated in baseband or as part of a carrier, where the computer readable program code is carried. Such propagated data signals may take a variety of forms including, but not limited to, electromagnetic signals, optical signals, or any suitable combination of the foregoing. The computer readable signal medium may also be any computer readable medium other than a computer readable storage medium that may send, propagate, or transmit a program for use by or in connection with an instruction execution system, apparatus, or device. The program code embodied on the computer-readable medium may be transmitted by any suitable medium, including but not limited to: wires, optical cables, Radio Frequency (RF), and the like, or any suitable combination thereof.

An embodiment of the present disclosure further provides a computer readable storage medium. The computer readable storage medium stores computer executable instructions which, when executed by a processor, implement the method for media content recommendation according to any of the foregoing embodiments.

An embodiment of the present disclosure further provides a computer program product, including a computer program. The computer program, when executed by a processor, implements the method for media content recommendation according to any of the foregoing embodiments.

The computer readable medium may be included in the foregoing electronic device, or may exist separately, and is not assembled into the electronic device.

The computer readable medium carries one or more programs, and when the one or more programs are executed by the electronic device, the electronic device performs the method shown in the foregoing embodiments.

Computer program code for performing the operations of the present disclosure may be written in one or more programming languages, including object-oriented programming languages, such as Java, Smalltalk, C++, and conventional procedural programming languages, such as the "C" language or similar programming languages. The program code may execute entirely on a user computer, partially on a user computer, as a stand-alone software package, partially on a user computer, partially on a remote computer, or entirely on a remote computer or server. In the case of a remote computer, the remote computer may be connected to the user computer through any kind of network, including a local area network (LAN) or a wide area network (WAN), or may be connected to an external computer (for example, using an Internet service provider for Internet connection).

The flowcharts and block diagrams in the figures illustrate architecture, functionality, and operation of possible implementations of systems, methods, and computer program products according to various embodiments of the present disclosure. In this regard, each block in the flowchart or block diagram may represent a module, program segment, or portion of code that includes one or more executable instructions for implementing the specified logical function. It should also be noted that in some alternative implementations, the functions noted in the blocks may also occur in a different order than that illustrated in the figures. For example, two consecutively represented blocks may actually be performed substantially in parallel, which may sometimes be performed in the reverse order, depending on the functionality involved. It is also noted that each block in the block diagrams and/or flowcharts, as well as combinations of blocks in the block diagrams and/or flowcharts, may be implemented with a dedicated hardware-based system that performs the specified functions or operations, or may be implemented in a combination of dedicated hardware and computer instructions.

The units involved in the embodiments of the present disclosure may be implemented in software, or may be implemented in hardware. In some cases, the name of a unit does not constitute a limitation on the unit itself. For example, a first obtaining unit may be further described as "obtaining at least two units of Internet Protocol addresses".

The functions described above may be performed, at least in part, by one or more hardware logic components. For example, without limitation, the example types of hardware logic components that may be used include: a field programmable gate array (FPGA), an application specific integrated circuit (ASIC for short), an application specific standard product (ASSP), a system on chip (SoC for short), a complex programmable logic device (Complex Programmable Logic Device, CPLD for short), and the like.

In the context of the present disclosure, a machine-readable medium may be a tangible medium that may contain or store a program for use by or in connection with an instruction execution system, apparatus, or device.

The machine-readable medium may be a machine-readable signal medium or a machine-readable storage medium. The machine-readable medium may include, but is not limited to, electronic, magnetic, optical, electromagnetic, infrared, or semiconductor systems, devices, or devices, or any suitable combination of the foregoing. More specific examples of machine-readable storage media may include electrical connections based on one or more lines, portable computer disks, hard disks, random access memory (RAM), read-only memory (ROM), erasable programmable read-only memory (EPROM or Flash memory), optical fibers, portable compact disc read-only memory (CD-ROM), optical storage devices, magnetic storage devices, or any suitable combination of the foregoing.

In a first aspect, a method of media content recommendation is provided according to one or more embodiments of the present disclosure, including: displaying, in a media content play interface, a predetermined recommendation control associated with a target topic, wherein the recommendation control includes at least one piece of live content information and a state control corresponding to a respective piece of live content information, the at least one piece of live content information corresponds to at least one target event associated with the target topic; and determining time information corresponding to the target topic, determining progress information of the target event corresponding to the live content information based on the time information, and determining a state control matching the progress information.

According to one or more embodiments of the present disclosure, the recommendation control further includes at least one recommended media content associated with the target topic, displaying the predetermined recommendation control associated with the target topic in the media content play interface includes: determining, in a predetermined topic list associated with the target topic, target list content satisfying a predetermined display condition; displaying at least one recommended media content associated with the target list content in the recommendation control; determining at least one piece of live content information associated with the target list content and/or recommended media content; and displaying, in the recommendation control, the at least one piece of live content information and a state control corresponding to the respective piece of live content information.

According to one or more embodiments of the present disclosure, displaying the predetermined recommendation control associated with the topic content in the media content play interface includes: playing a predetermined media content flow in the media content play interface; and in response to a switching triggered by the user in the media content play interface, switching to display the recommendation control in the media content play interface. Alternatively, displaying the predetermined recommendation control associated with the topic content in the media content play interface includes: displaying, in the media content play interface, a triggering control associated with the target topic; and in response to a triggering by the user on the triggering control, displaying the recommended control in the media content play interface.

According to one or more embodiments of the present disclosure, determining the time information corresponding to the target topic, determining the progress information of the target content event corresponding to the live content information based on the time information, and determining the state control matching the progress information includes: determining the time information corresponding to the target topic, and determining progress information of each target event based on the time information; and determining, for the live content information corresponding to the target event, the state control matching the progress information based on the progress information corresponding to the target event.

According to one or more embodiments of the present disclosure, the target event is a target live.

According to one or more embodiments of the present disclosure, the target topic includes a target game event, determining the time information corresponding to the target topic, and determining the progress information of each target event based on the time information includes: determining game schedule information corresponding to the target game event, and determining progress information of a target live corresponding to each game based on the game schedule information, wherein the target game event includes at least one game; determining, for the live content information corresponding to the target event, the state control matching the progress information based on the progress information corresponding to the target event includes: determining, for the target live corresponding to the game, the state control matching the progress information based on the progress information corresponding to the target live.

According to one or more embodiments of the present disclosure, the progress information of the target event includes the target event having not started, determining the state control matching the progress information includes: for each target event, in accordance with a determination that the progress information of the target event is that the target event has not started, determining a predetermined reservation control as the state control matching the progress information; after determining the state control matching the progress information, the method further includes: displaying, in a display area associated with the live content information, the predetermined reservation control and a start time corresponding to the target event.

According to one or more embodiments of the present disclosure, after displaying the predetermined reservation control and the start time corresponding to the target event in the display area associated with the live content information, the method further includes: in response to a triggering by the user on the reservation control, displaying text information corresponding to a predetermined reservation on the reservation control, and/or switching the reservation control to a non-triggered state.

According to one or more embodiments of the present disclosure, after displaying the predetermined reservation control and the start time corresponding to the target event in the display area associated with the live content information, the method further includes: in response to a triggering by the user on the reservation control, sending, to the user at the start time, a start reminder corresponding to the target event.

According to one or more embodiments of the present disclosure, the progress information of the target event includes the target event being in progress; determining the state control matching the progress information includes: for each target event, in accordance with a determination that the progress information of the target event is that the target event is in progress, determining a predetermined live control as the state control matching the progress information; after determining the state control matching the progress information, the method further includes: displaying the predetermined live control in a display area associated with the live content information, and displaying a display content associated with the target event.

According to one or more embodiments of the present disclosure, after displaying the predetermined live control in the display area associated with the live content information, the method further includes: in response to a triggering by the user on the live control, switching to a live interface corresponding to the target event; displaying live content corresponding to the target event in the live interface.

According to one or more embodiments of the present disclosure, the progress information of the target event includes the target event being ended, determining the state control matching the progress information includes: for each target event, in accordance with a determination that the progress information of the target event is that the target event is ended, determining a predetermined end control as the state control matching the progress information; after determining the state control matching the progress information, the method further includes: displaying the predetermined end control in a display area associated with the live content information, and displaying a target event result corresponding to the target event.

According to one or more embodiments of the present disclosure, after displaying the predetermined end control in the display area associated with the live content information, the method further includes: in response to a triggering by the user on the end control, switching to a live interface corresponding to the target event; displaying, in the live interface, live playback content corresponding to the target event. Alternatively, after displaying the predetermined end control in the display area associated with the live content information, the method further includes: in response to a triggering by the user on the end control, displaying the time information corresponding to the target topic.

According to one or more embodiments of the present disclosure, the recommendation control further includes a predetermined interaction control, wherein the interaction control is configured to perform an interaction with a target object associated with the target event in response to a triggering by the user.

According to one or more embodiments of the present disclosure, before displaying the predetermined recommendation control associated with the target topic in the media content play interface, the method further includes: determining a current topic phase based on the time information corresponding to the target topic and a current time; and displaying, in the recommendation control, recommended content corresponding to the topic phase.

According to one or more embodiments of the present disclosure, displaying the recommended content corresponding to the topic phase in the recommended control includes: in accordance with a determination that the current topic phase is a predetermined first phase, displaying, in the recommendation control, first recommendation information associated with the target topic, wherein the first recommendation information includes one or more of: time information, prediction information for target event result, target list content, or target event recommendation information; in accordance with a determination that the current topic phase is a predetermined second phase, displaying, in the recommendation control, the at least one piece of live content information and the state control corresponding to the respective live content information, wherein the at least one piece of live content information corresponds one-to-one with at least one target event in the target topic; and in accordance with a determination that the current topic phase is a predetermined third phase, displaying, in the recommendation control, the live content information corresponding to the target event satisfying the predetermined recommendation condition, the state control corresponding to the live content information, and the predetermined vote control.

According to one or more embodiments of the present disclosure, the vote control includes a vote sub-control corresponding to respective participants in the target event satisfying the predetermined recommendation condition, after displaying the live content information corresponding to the target event satisfying the predetermined recommendation condition, the state control corresponding to the live content information, and the predetermined vote control in the recommendation control, the method further includes: in response to a triggering by the user on a vote sub-control corresponding to any participant, updating a number of votes corresponding to the participant based on the triggering.

According to one or more embodiments of the present disclosure, updating the number of votes corresponding to the participant based on the triggering in response to the triggering by the user on the vote sub-control corresponding to any participant includes: in response to the triggering by the user on the vote sub-control corresponding to any participant, determining a number of times of the triggering, and updating the number of votes corresponding to the participant based on the number of times of the triggering. Alternatively, updating the number of votes corresponding to the participant based on the triggering in response to the triggering by the user on the vote sub-control corresponding to the participant includes: in response to the triggering by the user on the vote sub-control corresponding to any participant, determining a triggering duration corresponding to the triggering; determining a number of times of voting corresponding to the triggering based on the triggering duration and a predetermined mapping relationship between the triggering duration and the number of times of voting; updating the number of votes corresponding to the participant based on the number of times of voting.

According to one or more embodiments of the present disclosure, after in response to the triggering by the user on the vote sub-control corresponding to any participant, updating the number of votes corresponding to the participant based on the triggering, the method further includes: in accordance with a determination that the progress information of the target event satisfying the predetermined recommendation condition is in progress, switching to a live interface in response to a triggering by the user on a live control associated with the live content information; displaying, in the live interface, target live content corresponding to the target event, the vote control, and the updated number of votes.

According to one or more embodiments of the present disclosure, after displaying the predetermined recommendation control associated with the target topic in the media content play interface, the method further includes: in response to a triggering by the user on a predetermined display area or a predetermined viewing control in the recommendation control, displaying topic detail information corresponding to the target topic; the topic detail information including one or more of: time information, promotion chart information, list information.

According to one or more embodiments of the present disclosure, the media content play interface is configured to play a media content flow.

According to one or more embodiments of the present disclosure, after displaying the predetermined recommendation control associated with the target topic in the media content play interface, further includes: in response to a switching triggered by the user in the media content play interface, switching to play a media content in the predetermined media content flow.

In a second aspect, an apparatus for media content recommendation is provided according to one or more embodiments of the present disclosure, including: a display module, configured to display, in a media content play interface, a predetermined recommendation control associated with a target topic, wherein the recommendation control includes at least one piece of live content information and a state control corresponding to a respective piece of live content information, the at least one piece of live content information corresponds to at least one target event associated with the target topic; and a determination module, configured to determine time information corresponding to the target topic, determine progress information of the target event corresponding to the live content information based on the time information, and determine a state control matching the progress information.

According to one or more embodiments of the present disclosure, the recommendation control further includes at least one recommended media content associated with the target topic. The display module is configured to determine, in a predetermined topic list associated with the target topic, target list content satisfying a predetermined display condition; display at least one recommended media content associated with the target list content in the recommendation control; determine at least one piece of live content information associated with the target list content and/or recommended media content; and display, in the recommendation control, the at least one piece of live content information and a state control corresponding to the respective piece of live content information.

According to one or more embodiments of the present disclosure, play a predetermined media content flow in the media content play interface; and in response to a switching triggered by the user in the media content play interface, switch to display the recommendation control in the media content play interface. Alternatively, the display module is configured to display, in the media content play interface, a triggering control associated with the target topic; and in response to a triggering by the user on the triggering control, display the recommended control in the media content play interface.

According to one or more embodiments of the present disclosure, the determination module is configured to determine the time information corresponding to the target topic, and determine progress information of each target event based on the time information; and determine, for the live content information corresponding to the target event, the state control matching the progress information based on the progress information corresponding to the target event.

According to one or more embodiments of the present disclosure, the target event is a target live.

According to one or more embodiments of the present disclosure, the target topic includes a target game event. The determination module is configured to determine game schedule information corresponding to the target game event, determine progress information of a target live corresponding to each game based on the game schedule information, wherein the target game event includes at least one game; and determine, for the target live corresponding to the game, the state control matching the progress information based on the progress information corresponding to the target live.

According to one or more embodiments of the present disclosure, the progress information of the target event includes that the target event having not started. The determination module is configured to for each target event, in accordance with a determination that the progress information of the target event is that the target event has not started, determine a predetermined reservation control as the state control matching the progress information. The apparatus further includes: a display module, configured to display, in a display area associated with the live content information, the predetermined reservation control and a start time corresponding to the target event.

According to one or more embodiments of the present disclosure, the apparatus further includes: a processing module, configured to, in response to a triggering by the user on the reservation control, display text information corresponding to a predetermined reservation on the reservation control, and/or switch the reservation control to a non-triggered state.

According to one or more embodiments of the present disclosure, the apparatus further includes: a processing module, configured to, in response to a triggering by the user on the reservation control, send, to the user at the start time, a start reminder corresponding to the target event.

According to one or more embodiments of the present disclosure, the progress information of the target event includes the target event being in progress. The determination module is configured to: for each target event, in accordance with a determination that the progress information of the target event is that the target event is in progress, determine a predetermined live control as the state control matching the progress information. The apparatus further includes: a display module, configured to display the predetermined live control in a display area associated with the live content information, and display a display content associated with the target event.

According to one or more embodiments of the present disclosure, the apparatus further includes: a processing module, configured to, in response to a triggering by the user on the live control, switch to a live interface corresponding to the target event; and a displaying module, configured to display live content corresponding to the target event in the live interface.

According to one or more embodiments of the present disclosure, the progress information of the target event includes the target event being ended. The determination module is configured to: for each target event, in accordance with a determination that the progress information of the target event is that the target event is ended, determine a predetermined end control as the state control matching the progress information. The apparatus further includes: a display module, configured to display the predetermined end control in a display area associated with the live content information, and display a target event result corresponding to the target event.

According to one or more embodiments of the present disclosure, the apparatus further includes: a processing module, configured to, in response to a triggering by the user on the end control, switch to a live interface corresponding to the target event; and a display module, configured to display, in the live interface, live playback content corresponding to the target event. Alternatively, the apparatus further includes: a display module, configured to display, in response to a triggering by the user on the end control, display the time information corresponding to the target topic.

According to one or more embodiments of the present disclosure, the recommendation control further includes a predetermined interaction control, and the interaction control is configured to perform an interaction with a target object associated with the target event in response to a triggering by the user.

According to one or more embodiments of the present disclosure, the apparatus further includes: a determination module, configured to determine a current topic phase based on the time information corresponding to the target topic and a current time; and a display module, configured to display, in the recommendation control, recommended content corresponding to the topic phase.

According to one or more embodiments of the present disclosure, the display module is configured to: in accordance with a determination that the current topic phase is a predetermined first phase, display, in the recommendation control, first recommendation information associated with the target topic, wherein the first recommendation information includes one or more of: time information, prediction information for target event result, target list content, or target event recommendation information; in accordance with a determination that the current topic phase is a predetermined second phase, display, in the recommendation control, the at least one piece of live content information and the state control corresponding to the respective live content information, wherein the at least one piece of live content information corresponds one-to-one with at least one target event in the target topic; and in accordance with a determination that the current topic phase is a predetermined third phase, display, in the recommendation control, the live content information corresponding to the target event satisfying the predetermined recommendation condition, the state control corresponding to the live content information, and the predetermined vote control.

According to one or more embodiments of the present disclosure, the vote control includes a vote sub-control corresponding to respective participants in the target event satisfying the predetermined recommendation condition. The apparatus further includes: a processing module, configured to, in response to a triggering by the user on a vote sub-control corresponding to any participant, update a number of votes corresponding to the participant based on the triggering.

According to one or more embodiments of the present disclosure, the processing module is configured to: in response to the triggering by the user on the vote sub-control corresponding to any participant, determine a number of times of the triggering, and update the number of votes corresponding to the participant based on the number of times of the triggering. Alternatively, the processing module is configured to: in response to the triggering by the user on the vote sub-control corresponding to any participant, determine a triggering duration corresponding to the triggering; determine a number of times of voting corresponding to the triggering based on the triggering duration and a predetermined mapping relationship between the triggering duration and the number of times of voting; and update the number of votes corresponding to the participant based on the number of times of voting.

According to one or more embodiments of the present disclosure, the apparatus further includes: a processing module, configured to, in accordance with a determination that the progress information of the target event satisfying the predetermined recommendation condition is in progress, switch to a live interface in response to a triggering by the user on a live control associated with the live content information; and a display module, configured to display, in the live interface, target live content corresponding to the target event, the vote control, and the updated number of votes.

According to one or more embodiments of the present disclosure, the apparatus further includes: a display module, configured to in response to a triggering by the user on a predetermined display area or a predetermined viewing control in the recommendation control, display topic detail information corresponding to the target topic.

The topic detail information includes one or more of: time information, promotion chart information, list information.

According to one or more embodiments of the present disclosure, the media content play interface is configured to play a media content flow.

According to one or more embodiments of the present disclosure, the apparatus further includes: a processing module, configured to, in response to a switching triggered by the user in the media content play interface, switch to play a media content in the predetermined media content flow.

In a third aspect, an electronic device is provided according to one or more embodiments of the present disclosure, including: at least one processor and a memory. The memory stores computer executable instructions. The at least one processor executes the computer executable instructions stored in the memory, to cause the at least one processor to perform the method of media content recommendation according to the first aspect and various possible designs of the first aspect.

In a fourth aspect, a computer readable storage medium is provided according to one or more embodiments of the present disclosure. The computer readable storage medium has stored computer executable instructions thereon. The computer executable instructions, when executed by a processor, implement the method of media content recommendation according to the first aspect and the possible designs of the first aspect is implemented.

In a fifth aspect, a computer program product is provided according to one or more embodiments of the present disclosure. The computer program includes a computer program. The computer program, when executed by a processor, implements the method of media content recommendation according to the first aspect and various possible designs of the first aspect.

The above description is only for the preferred embodiments of the present disclosure and an explanation of the technical principles used. Those skilled in the art should understand that the scope involved in the present disclosure is not limited to technical solutions formed by specific combinations of the foregoing technical features and should also cover other technical solutions formed by any combinations of the foregoing technical features or their equivalent features without departing from the disclosed concept. For example, a technical solution is formed by replacing the above features with (but not limited to) technical features with similar functions disclosed in the present disclosure.

Furthermore, although operations are depicted in a specific order, this should not be understood as requiring that these operations be performed in the specific order shown or performed in a sequential order. In certain environments, multitasking and parallel processing may be advantageous. Likewise, although several specific implementation details are included in the above discussion, these should not be interpreted as limitations on the scope of present disclosure. Certain features described in the context of individual embodiments may also be combined to be implemented in a single embodiment. On the contrary, various features described in the context of a single embodiment may also be implemented separately or in any suitable sub combination in multiple embodiments.

Although the present subject matter has been described in language specific to structural features and/or methodological logical actions, it should be understood that the subject matter defined in the attached claims may not necessarily be limited to the specific features or acts described above. On the contrary, the specific features and actions described above are only example forms of implementing the claims.

We claim:

1. A method of media content recommendation, comprising:

displaying, in a media content play interface, a recommendation control associated with a topic, wherein the recommendation control comprises at least one item of live content information and a state control corresponding to a respective item of live content information, the at least one item of live content information corresponds to at least one event associated with the topic; and determining time information corresponding to the topic, determining progress information of the event corresponding to the live content information based on the time information, and determining a state control matching the progress information.

2. The method of claim 1, wherein the recommendation control further comprises at least one recommended media content associated with the topic, and displaying the recommendation control associated with the topic in the media content play interface comprises:

determining, in a topic list associated with the topic, list content satisfying a display condition;

displaying at least one recommended media content associated with the list content in the recommendation control;

determining at least one item of live content information associated with at least one of the list content or recommended media content; and displaying, in the recommendation control, the at least one item of live content information and a state control corresponding to the respective item of live content information.

3. The method of claim 1, wherein displaying the recommendation control associated with the topic in the media content play interface comprises:

playing a media content flow in the media content play interface; and in response to a switching triggered in the media content play interface, switching to display the recommendation control in the media content play interface, or displaying the recommendation control associated with the topic in the media content play interface comprises:

displaying, in the media content play interface, a triggering control associated with the topic; and in response to a triggering on the triggering control, displaying the recommendation control in the media content play interface.

4. The method of claim 1, wherein determining the time information corresponding to the topic, determining the progress information of the event corresponding to the live content information based on the time information, and determining the state control matching the progress information comprises:

determining the time information corresponding to the topic, and determining progress information of each event based on the time information; and determining, for the live content information corresponding to the event, the state control matching the progress information based on the progress information corresponding to the event.

5. The method of claim 4, wherein the event is a live, the topic comprises a game event, determining the time information corresponding to the topic, and determining the progress information of each event based on the time information comprises:

determining game schedule information corresponding to the game event, and determining progress information of a live corresponding to each game based on the game schedule information, wherein the game event comprises at least one game; and determining, for the live content information corresponding to the event, the state control matching the progress information based on the progress information corresponding to the event comprises:

determining, for the live corresponding to the game, the state control matching the progress information based on the progress information corresponding to the live.

6. The method of claim 1, wherein the progress information of the event comprises the event having not started, determining the state control matching the progress information comprises:

for each event, in accordance with a determination that the progress information of the event is that the event has not started, determining a reservation control as the state control matching the progress information, and wherein the method further comprises:

displaying, in a display area associated with the live content information, the reservation control and a start time corresponding to the event.

7. The method of claim 6, wherein the method further comprises:

in response to a triggering on the reservation control, performing at least one of displaying text information corresponding to a reservation on the reservation control, or switching the reservation control to a non-triggered state, or in response to a triggering on the reservation control, sending, to a user at the start time, a start reminder corresponding to the event.

8. The method of claim 1, wherein the progress information of the event comprises the event being in progress;

determining the state control matching the progress information comprises:

for each event, in accordance with a determination that the progress information of the event is that the event is in progress, determining a live control as the state control matching the progress information, wherein the method further comprises:

displaying the live control in a display area associated with the live content information, and displaying a display content associated with the event, and in response to a triggering on the live control, switching to a live interface corresponding to the event; and displaying live content corresponding to the event in the live interface.

9. The method of claim 1, wherein the progress information of the event comprises the event being ended, determining the state control matching the progress information comprises:

for each event, in accordance with a determination that the progress information of the event is that the event is ended, determining an end control as the state control matching the progress information, and wherein the method further comprises:

displaying the end control in a display area associated with the live content information, and displaying an event result corresponding to the event.

10. The method of claim 9, wherein the method further comprises:

in response to a triggering on the end control, switching to a live interface corresponding to the event; and displaying, in the live interface, live playback content corresponding to the event, or, in response to a triggering on the end control, displaying the time information corresponding to the topic.

11. The method of claim 1, wherein the recommendation control further comprises an interaction control, wherein the interaction control is configured to perform an interaction with an object associated with the event in response to a triggering.

12. The method of claim 1, wherein the method further comprises:

determining a current topic phase based on the time information corresponding to the topic and a current time; and displaying, in the recommendation control, recommended content corresponding to the current topic phase.

13. The method of claim 12, wherein displaying the recommended content corresponding to the current topic phase in the recommendation control comprises:

in accordance with a determination that the current topic phase is a first phase, displaying, in the recommendation control, first recommendation information associated with the topic, wherein the first recommendation information comprises one or more of: time information, prediction information for event result, list content, or event recommendation information;

in accordance with a determination that the current topic phase is a second phase, displaying, in the recommendation control, the at least one item of live content information and the state control corresponding to the respective live content information, wherein the at least one item of live content information corresponds one-to-one with at least one event in the topic; and in accordance with a determination that the current topic phase is a third phase, displaying, in the recommendation control, the live content information corresponding to the event satisfying a recommendation condition, the state control corresponding to the live content information, and a vote control.

14. The method of claim 13, wherein the vote control comprises a vote sub-control corresponding to respective participants in the event satisfying the recommendation condition, and wherein the method further comprises:

in response to a triggering on a vote sub-control corresponding to any participant, updating a number of votes corresponding to the participant based on the triggering.

15. The method of claim 14, wherein updating the number of votes corresponding to the participant based on the triggering in response to the triggering on the vote sub-control corresponding to any participant comprises:

in response to the triggering on the vote sub-control corresponding to any participant, determining a number of times of the triggering, and updating the number of votes corresponding to the participant based on the number of times of the triggering; or updating the number of votes corresponding to the participant based on the triggering in response to the triggering on the vote sub-control corresponding to the participant comprises:

in response to the triggering on the vote sub-control corresponding to any participant, determining a triggering duration corresponding to the triggering;

determining a number of times of voting corresponding to the triggering based on the triggering duration and a mapping relationship between the triggering duration and the number of times of voting; and updating the number of votes corresponding to the participant based on the number of times of voting.

16. The method of claim 14, wherein the method further comprises:

in accordance with a determination that the progress information of the event satisfying the recommendation condition is in progress, switching to a live interface in response to a triggering on a live control associated with the live content information; and displaying, in the live interface, live content corresponding to the event, the vote control, and the updated number of votes.

17. The method of claim 1, wherein the method further comprises:

in response to a triggering on a display area or a viewing control in the recommendation control, displaying topic detail information corresponding to the topic; and the topic detail information comprising one or more of: time information, promotion chart information, list information.

18. The method of claim 1, wherein the media content play interface is configured to play a media content flow, and the method further comprises:

in response to a switching triggered in the media content play interface, switching to play a media content in the media content flow.

19. An electronic device, comprising: a processor and a memory;

the memory storing computer executable instructions;

the processor executing the computer executable instructions stored in the memory, to cause the processor to implement acts comprising:

displaying, in a media content play interface, a recommendation control associated with a topic, wherein the recommendation control comprises at least one item of live content information and a state control corresponding to a respective item of live content information, the at least one item of live content information corresponds to at least one event associated with the topic; and determining time information corresponding to the topic, determining progress information of the event corresponding to the live content information based on the time information, and determining a state control matching the progress information.

20. A computer non-transitory readable storage medium, wherein the computer readable storage medium has computer executable instructions stored thereon, the computer executable instructions, when executed by a processor, implement acts comprising:

displaying, in a media content play interface, a recommendation control associated with a topic, wherein the recommendation control comprises at least one item of live content information and a state control corresponding to a respective item of live content information, the at least one item of live content information corresponds to at least one event associated with the topic; and determining time information corresponding to the topic, determining progress information of the event corresponding to the live content information based on the time information, and determining a state control matching the progress information.

* * * * *